(12) United States Patent
Mazzarese et al.

(10) Patent No.: US 10,840,984 B2
(45) Date of Patent: *Nov. 17, 2020

(54) METHOD FOR REPORTING CHANNEL STATE INFORMATION, USER EQUIPMENT, AND BASE STATION

(71) Applicant: Huawei Technologies Co., Ltd., Shenzhen (CN)

(72) Inventors: David jean-marie Mazzarese, Shenzhen (CN); Yongxing Zhou, Shenzhen (CN); Yan Cheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/827,826

(22) Filed: Nov. 30, 2017

(65) Prior Publication Data

US 2018/0091208 A1 Mar. 29, 2018

Related U.S. Application Data

(63) Continuation of application No. 14/709,735, filed on May 12, 2015, now Pat. No. 9,866,302, which is a (Continued)

(51) Int. Cl.
*H04B 7/06* (2006.01)
*H04L 5/00* (2006.01)
(Continued)

(52) U.S. Cl.
CPC ............ *H04B 7/0626* (2013.01); *H04B 7/04* (2013.01); *H04B 7/0645* (2013.01);
(Continued)

(58) Field of Classification Search
CPC .... H04B 7/0626; H04B 7/024; H04B 7/0619; H04J 11/0053; H04J 11/00; H04J 3/1694; H04W 24/08
See application file for complete search history.

(56) References Cited

U.S. PATENT DOCUMENTS 9,270,439 B2 * 2/2016 Nam .................. H04L 1/0025
9,602,183 B2 * 3/2017 Kim .................. H04L 1/0026
(Continued)

FOREIGN PATENT DOCUMENTS

CN 101777941 A 7/2010
CN 102123015 A 7/2011
(Continued)

OTHER PUBLICATIONS

R1-110050 CATT, "Discussion on CQI definition," 3GPP TSG RAN WG1 Meeting #63bis, Dublin, Ireland, Jan. 17-21, 2011, 3 pages.
(Continued)

*Primary Examiner* — Melanie Jagannathan
(74) *Attorney, Agent, or Firm* — Leydig, Voit & Mayer, Ltd.

(57) ABSTRACT

The present disclosure relates to a method for reporting channel state information, a user equipment, and a base station. A channel state information measurement resource is determined by a UE according to an aperiodic CSI trigger signaling, so that a base station transmits a CSI-RS only when the UE needs to report the aperiodic CSI. Compared with transmitting a periodic CSI-RS by an existing base station, unnecessary transmitting of the CSI-RS is reduced, and energy of the base station such as an eNB is saved; and reducing the CSI-RS transmission may reduce resources occupied by the CSI-RS, thereby improving the spectrum efficiency of the system. In addition, reducing unnecessary CSI-RS transmission allows the interference in other cells
(Continued)

---

11 — a UE receives or detects an aperiodic CSI trigger signaling in a sub-frame n, where the n is an integer 12 — the UE determines a CSI measurement resource, where the CSI measurement resource is at least one of a CSI-RS resource and an IMR 13 — the UE reports the aperiodic CSI according to the aperiodic CSI trigger signaling received or detected in the step 11, where the reported aperiodic CSI is derived based on the measurement resource determined in the step 12 by the base station being reduced; finally, CSI measurement resources are reserved only when the CSI needs to be fed back, the cost occupied by the CSI measurement resources is reduced.

32 Claims, 4 Drawing Sheets

Related U.S. Application Data continuation of application No. PCT/CN2012/084483, filed on Nov. 12, 2012.

(51) Int. Cl.
*H04B 7/04* (2017.01)
*H04B 17/309* (2015.01)
*H04W 72/04* (2009.01)

(52) U.S. Cl.
CPC ......... *H04B 17/309* (2015.01); *H04L 5/0051* (2013.01); *H04L 5/0094* (2013.01); *H04W 72/042* (2013.01); *Y02B 70/30* (2013.01); *Y02D 70/00* (2018.01); *Y02D 70/1262* (2018.01); *Y02D 70/1264* (2018.01); *Y02D 70/444* (2018.01)

(56) References Cited

U.S. PATENT DOCUMENTS

| | | | |
|---|---|---|---|
| 9,912,430 B2* | 3/2018 | Sayana | H04J 3/1694 |
| 2011/0170496 A1 | 7/2011 | Fong et al. | |
| 2011/0249578 A1 | 10/2011 | Nayeb et al. | |
| 2011/0268077 A1 | 11/2011 | Wan et al. | |
| 2012/0076017 A1* | 3/2012 | Luo | H04L 1/0026 |
| | | | 370/252 |
| 2012/0127869 A1 | 5/2012 | Yin et al. | |
| 2012/0201154 A1 | 8/2012 | Chandrasekhar et al. | |
| 2012/0208547 A1 | 8/2012 | Geirhofer et al. | |
| 2012/0281554 A1 | 11/2012 | Gao et al. | |
| 2013/0028182 A1 | 1/2013 | Geirhofer et al. | |
| 2013/0064165 A1 | 3/2013 | Chen et al. | |
| 2013/0107832 A1* | 5/2013 | Kim | H04B 7/024 |
| | | | 370/329 |
| 2013/0121301 A1 | 5/2013 | Kim et al. | |
| 2013/0121312 A1 | 5/2013 | Roman et al. | |
| 2013/0329711 A1 | 12/2013 | Seo et al. | |
| 2014/0036747 A1 | 2/2014 | Nory et al. | |
| 2014/0086174 A1* | 3/2014 | Nam | H04L 1/0003 |
| | | | 370/329 |
| 2014/0126476 A1 | 5/2014 | Kang et al. | |
| 2014/0133418 A1 | 5/2014 | Takeda et al. | |
| 2014/0321313 A1* | 10/2014 | Seo | H04J 11/00 |
| | | | 370/252 |
| 2014/0355468 A1 | 12/2014 | Li et al. | |
| 2015/0003268 A1 | 1/2015 | Wang et al. | |
| 2017/0111815 A1 | 4/2017 | Seo et al. | |

FOREIGN PATENT DOCUMENTS

| | | |
|---|---|---|
| CN | 102244881 A | 11/2011 |
| CN | 102291224 A | 12/2011 |
| CN | 102315871 A | 1/2012 |
| CN | 102368697 A | 3/2012 |
| CN | 102448088 A | 5/2012 |
| WO | 2011158921 A1 | 12/2011 |
| WO | 2012067442 A2 | 5/2012 |
| WO | 2012112291 A1 | 8/2012 |
| WO | 2012155523 A1 | 11/2012 |

OTHER PUBLICATIONS

R1-106404 Ericsson, ST-Ericsson, "Discussion on CSI-RS collision avoidance," 3GPP TSG-RAN WG1 #63, Jacksonville, USA, Nov. 15-19, 2010, 6 pages.
R1-122243 Samsung, "CoMP RRC Parameters," 3GPP TSG RAN WG1 #69, Prague, Czech Republic, May 21-25, 2012, 5 pages.
"3rd Generation Partnership Project; Technical Specification Group Radio Access Network; Evolved Universal Terrestrial Radio Access (E-UTRA); Physical layer procedures (Release 11)," 3GPP TS 36.213, V11.0.0, pp. 1-143, 3rd Generation Partnership Project, Valbonne, France (Sep. 2012).
U.S. Appl. No. 14/709,735, filed May 12, 2015.

* cited by examiner

METHOD FOR REPORTING CHANNEL STATE INFORMATION, USER EQUIPMENT, AND BASE STATION

CROSS REFERENCE TO RELATED APPLICATIONS

This application is a continuation of U.S. patent application Ser. No. 14/709,735, filed on May 12, 2015, which is a continuation of International Patent Application No. PCT/CN2012/084483, filed on Nov. 12, 2012. All of the aforementioned patent applications are hereby incorporated by reference in their entireties.

TECHNICAL FIELD

The present disclosure relates to wireless communication technologies and, in particular, to methods for reporting channel state information, user equipment, and base stations.

BACKGROUND

In the wireless communication system, due to factors such as the mobility of a user equipment (UE) and the multi-path propagation of a wireless signal, the channel state between a base station and a UE is changed along with a change of factors such as the time, frequency, and the UE location. Therefore, a measurement of the channel state needs to be performed, then a communication is performed according to the measured channel state information (CSI), so as to ensure the transmission efficiency of the system and improve the quality of service of the UE.

As in the long term evolution (LTE) system and the long term evolution-advanced (LTE-Advanced, LTE-A) system, a UE needs to measure and feeds back various measured values to a base station. For example: in order to support a dynamic scheduling and downlink multi-input multi-output (MIMO) transmission technique, the UE needs to measure the channel state and report the CSI to the base station; in order to support a cell reselection and cell handover, the UE needs to measure and report the reference signal received power (RSRP) and reference signal received quality (RSRQ) to the base station; in order to support an uplink power control, a physical layer of the UE needs to measure and report the RSRP to a high layer of the UE, after the high layer filters the reported RSRP, the physical layer measures a path loss (PL) needed in a uplink power control formula by using the filtered RSRP, and the like.

The reporting of CSI includes a periodic CSI reporting and an aperiodic CSI reporting. Moreover, either the periodically reported CSI or the aperiodically reported CSI needs to be derived by combining the measurement signal and channel interference from the environment. In the LTE system, the measuring of channel state may be based on a cell-specific reference signal (CRS), and may also be based on a channel-state information—reference signal (CSI-RS), i.e., a channel state measurement signal may be the CRS, and may also be the CSI-RS. Carriers in the LTE system are backward-compatible, which may support a LTE UE access of previous versions and be served.

Generally, the CRS is usually transmitted on full frequency band of each downlink sub-frame, and the CSI-RS is periodically transmitted on full frequency band with a fixed period. If the channel state is measured based on the CSI-RS, either for the periodic CSI reporting or for the aperiodic CSI reporting, the base station will periodically transmit the CSI-RS with the fixed period so as measure the channel state, so that the CSI is derived. Therefore, for the aperiodic CSI reporting, the base station will transmit unnecessary CSI-RS, so that unnecessary energies and resources are consumed, not only spectrum efficiency of a system is reduced, but also unnecessary interferences are brought to other cells.

Additionally, no matter for the periodic CSI reporting or the aperiodic CSI reporting, an observation interval of a CSI, which is reported in an uplink sub-frame n, in time domain and frequency domain is not limited, e.g., a UE may average measured channels and/or interferences based on a plurality of sub-frames and/or a plurality of sub-bands so as to derive the CSI, and report to a base station. The UE may also derive the CSI based on channels and/or interferences of one sub-frame and/or one sub-band merely, and report to the base station. When the base station receives the CSI reported by the UE, the base station does not know whether the reported CSI is derived by averaging the channels and/or interferences based on a plurality of sub-frames and/or a plurality of sub-bands, or the reported CSI is derived based on the channels and/or interferences of one sub-frame and/or one sub-band merely. Moreover, when the UE employs an averaging method to derive a CSI, the reported CSI can only represent an average channel characteristic.

In order to solve the above problem, in the LTE system, when a UE is configured with a transmission mode 10, one or more CSI processes may be configured to the UE. One CSI process corresponds to one non-zero power CSI-RS resource and one interference measurement resource (IMR). When the UE is configured with a plurality of CSI processes, different CSI processes may represent different interference environments, so that the base station may derive channel state information in different environments based on the CSI derived through different CSI processes, so as to facilitate the realization of the CoMP transmission mechanism. However, in practical application, due to reasons such as the limited capacity of the UE, some UEs can only be configured with one CSI process. Therefore, a solution is needed to solve the problem that the base station can not derive the CSI of such type of UE in different scenes (or say different interference environments).

SUMMARY

Embodiments of the present disclosure provide a method for reporting channel state information, a user equipment and a base station, so as to save energy consumption of a base station and to reduce interference between base stations.

The first aspect of embodiments of the present disclosure provides a method for reporting channel state information, including:

receiving or detecting, by a user equipment (UE), an aperiodic channel state information (CSI) trigger signaling in a sub-frame n, where the n is an integer;

determining, by the UE, a CSI measurement resource, where the CSI measurement resource is at least one of a channel state information reference signal (CSI-RS) resource and an interference measurement resource; and reporting, by the UE, an aperiodic CSI according to the aperiodic CSI trigger signaling, where the reported aperiodic CSI is derived based on a determined CSI measurement resource.

The second aspect of embodiments of the present disclosure provides a method for reporting channel state information, including:

transmitting, by a base station, an aperiodic channel state information (CSI) trigger signaling in a sub-frame n, where the n is an integer;

determining, by the base station, a CSI measurement resource, where the CSI measurement resource is at least one of a channel state information reference signal (CSI-RS) resource and an interference measurement resource; and performing, by the base station, information transmission according to a determined CSI measurement resource.

The third aspect of embodiments of the present disclosure provides a method for information transmission, including:

receiving, by a UE, a downlink control channel signaling in a sub-frame n; where the n is an integer;

determining, by the UE, a channel state information (CSI) measurement resource according to a received downlink control channel signaling, where the CSI measurement resource is at least one of a channel state information reference signal (CSI-RS) resource and an interference measurement resource; and performing, by the UE, information decoding according to a determined CSI measurement resource.

The fourth aspect of embodiments of the present disclosure provides a method for reporting channel state information, including:

deriving, by a user equipment (UE), a channel state information (CSI); and reporting, by the UE, the derived CSI to a base station;

where, the deriving, by the UE, the CSI, including:

deriving, by the UE, the CSI based on an unrestricted observation interval, if the CSI is a periodic CSI; deriving, by the UE, the CSI based on a restricted observation interval, if the CSI is an aperiodic CSI;

or including:

deriving, by the UE, the CSI based on an unrestricted observation interval, if the UE is configured with at least two CSI processes; deriving, by the UE, the CSI based on a restricted observation interval, if the UE is merely configured with one CSI process or the UE merely possesses a capability of supporting one CSI process;

or including:

deriving, by the UE, the CSI based on a restricted observation interval, if the UE is configured with one CSI process or the UE merely possesses a capability of supporting one CSI process, and the CSI is an aperiodic CSI;

or including:

deriving, by the UE, the CSI according to a manner indicated in a high layer signaling transmitted by the base station.

or including:

deriving, by the UE, the CSI based on an observation interval indicated in a high layer signaling transmitted by the base station.

The fifth aspect of embodiments of the present disclosure provides a method for receiving channel state information, including:

receiving, by a base station, a channel state information (CSI) reported by a user equipment (UE); and determining, by the base station, a manner for deriving the CSI by the UE;

where, the determining, by the base station, the manner for deriving the CSI by the UE, including:

determining, by the base station, that the UE derives the CSI based on an unrestricted observation interval, if the CSI is a periodic CSI; determining, by the base station, that the UE derives the CSI based on a restricted observation interval, if the CSI is an aperiodic CSI;

or including:

determining, by the base station, that the UE derives the CSI based on an unrestricted observation interval, if the UE is configured with at least two CSI processes; determining, by the base station, that the UE derives the CSI based on a restricted observation interval, if the UE is merely configured with one CSI process or the UE merely possesses a capability of supporting one CSI process;

or including:

determining, by the base station, that the UE derives the CSI based on a restricted observation interval, if the UE is configured with one CSI process or the UE merely possesses a capability of supporting one CSI process, and the CSI is an aperiodic CSI;

or including:

determining, by the base station, that the UE derives the CSI according to a manner indicated in a high layer signaling transmitted by the base station;

or including:

determining, by the base station, that the UE derives the CSI based on an observation interval indicated in a high layer signaling transmitted by the base station;

or including:

acquiring, by the base station, the manner for deriving the CSI by the UE according to a received manner for deriving the CSI reported by the UE.

The sixth aspect of embodiments of the present disclosure provides a user equipment, including:

a first signaling receiving module, configured to receive or detect an aperiodic channel state information (CSI) trigger signaling in a sub-frame n, where the n is an integer;

a first resource determining module, configured to determine a CSI measurement resource, where the CSI measurement resource is at least one of a channel state information reference signal (CSI-RS) resource and an interference measurement resource; and a first CSI reporting module, configured to report an aperiodic CSI according to the aperiodic CSI trigger signaling, where the reported aperiodic CSI is derived based on the determined CSI measurement resource.

The seventh aspect of embodiments of the present disclosure provides a base station, including:

a signaling transmitting module, configured to transmit an aperiodic channel state information (CSI) trigger signaling in a sub-frame n, where the n is an integer;

a resource determining module, configured to determine a CSI measurement resource, where the CSI measurement resource is at least one of a channel state information reference signal (CSI-RS) resource and an interference measurement resource; and an information transmission module, configured to perform information transmission according to the determined CSI measurement resource.

The eighth aspect of embodiments of the present disclosure provides a user equipment, including:

a second signaling receiving module, configured to receive a downlink control channel signaling in a sub-frame n; where, the n is an integer;

a second resource determining module, configured to determine a channel state information (CSI) measurement resource according to a received downlink control channel signaling, where the CSI measurement resource is at least one of a channel state information reference signal (CSI-RS) resource and an interference measurement resource; and a decoding module, configured to perform information decoding according to the determined CSI measurement resource.

The ninth aspect of embodiments of the present disclosure provides a user equipment, including:

a CSI acquisition module, configured to derive a channel state information (CSI); and a second CSI reporting module, configured to report the derived CSI to a base station;

where, the CSI acquisition module is specifically configured to: the UE derives the CSI based on an unrestricted observation interval, if the CSI is a periodic CSI; the UE derives the CSI based on a restricted observation interval, if the CSI is an aperiodic CSI;

or specifically configured to:

derive the CSI based on an unrestricted observation interval, if the user equipment is configured with at least two CSI processes; derive the CSI based on a restricted observation interval, if the UE is merely configured with one CSI process or the UE merely possesses a capability of supporting one CSI process;

or specifically configured to:

derive the CSI based on a restricted observation interval, if the user equipment is configured with one CSI process or the UE merely possesses a capability of supporting one CSI process, and the CSI is an aperiodic CSI;

or specifically configured to:

derive the CSI according to a manner indicated in a high layer signaling transmitted by the base station;

or specifically configured to:

derive the CSI based on an observation interval indicated in a high layer signaling transmitted by the base station.

The tenth aspect of embodiments of the present disclosure provides a base station, including:

a CSI receiving module, configured to receive a channel state information (CSI) reported by a user equipment (UE); and a manner determining module, configured to determine a manner for deriving the CSI by the UE;

where, the manner determining module is specifically configured to:

determine that the UE derives the CSI based on an unrestricted observation interval, if the CSI is a periodic CSI; determine that the UE derives the CSI based on a restricted observation interval, if the CSI is an aperiodic CSI;

or specifically configured to:

determine that the UE derives the CSI based on an unrestricted observation interval, if the UE is configured with at least two CSI processes; determine that the UE derives the CSI based on a restricted observation interval, if the UE is merely configured with one CSI process or the UE merely possesses a capability of supporting one CSI process;

or specifically configured to:

determine that the UE derives the CSI based on a restricted observation interval, if the UE is configured with one CSI process or the UE merely possesses a capability of supporting one CSI process, and the CSI is an aperiodic CSI;

or specifically configured to:

determine that the UE derives the CSI according to a manner indicated in a high layer signaling transmitted by the base station;

or specifically configured to:

determine that the UE derives the CSI based on an observation interval indicated in a high layer signaling transmitted by the base station;

or specifically configured to:

acquire the manner for deriving the CSI by the UE according to a received manner for deriving the CSI reported by the UE.

The eleventh aspect of embodiments of the present disclosure provides a user equipment, including: a receiver, a processor and a transmitter, the receiver is configured to receive or detect an aperiodic channel state information (CSI) trigger signaling in a sub-frame n, where the n is an integer; the processor is configured to determine a CSI measurement resource, where the CSI measurement resource is at least one of a channel state information reference signal (CSI-RS) resource and an interference measurement resource; the transmitter is configured to report an aperiodic CSI according to the aperiodic CSI trigger signaling, where the reported aperiodic CSI is derived by the processor based on the determined CSI measurement resource.

The twelfth aspect of embodiments of the present disclosure provides a base station, including: a processor and a transmitter, the transmitter is configured to transmit an aperiodic channel state information (CSI) trigger signaling in a sub-frame n, where the n is an integer; the processor is configured to determine a CSI measurement resource, where the CSI measurement resource is at least one of a channel state information reference signal (CSI-RS) resource and an interference measurement resource; the transmitter is further configured to perform information transmission according to the CSI measurement resource determined by the processor.

The thirteenth aspect of embodiments of the present disclosure provides a user equipment, including: a receiver and a processor, the receiver is configured to receive a downlink control channel signaling in a sub-frame n; where, the n is an integer; the processor is configured to determine a channel state information (CSI) measurement resource according to the received downlink control channel signaling, where the CSI measurement resource is at least one of a channel state information reference signal (CSI-RS) resource and an interference measurement resource; the processor is further configured to perform information decoding according to the determined CSI measurement resource.

The fourteenth aspect of embodiments of the present disclosure provides a user equipment, including: a processor and a transmitter, the processor is configured to derive a channel state information (CSI); the transmitter is configured to report the derived CSI to a base station;

the processor is specifically configured to: the UE derives the CSI based on an unrestricted observation interval, if the CSI is a periodic CSI; the UE derives the CSI based on a restricted observation interval, if the CSI is an aperiodic CSI;

or specifically configured to:

the UE derives the CSI based on an unrestricted observation interval, if the user equipment is configured with at least two CSI processes; the UE derives the CSI based on a restricted observation interval, if the UE is merely configured with one CSI process or the UE merely possesses a capability of supporting one CSI process;

or specifically configured to:

the UE derives the CSI based on a restricted observation interval, if the UE is configured with one CSI process or the UE merely possesses a capability of supporting one CSI process, and the CSI is an aperiodic CSI;

or specifically configured to:

the UE derives the CSI according to a manner indicated in a high layer signaling transmitted by the base station;

or specifically configured to:

the UE derives the CSI based on an observation interval indicated in a high layer signaling transmitted by the base station.

The fifteenth aspect of embodiments of the present disclosure provides a base station, including: a receiver and a processor, the receiver is configured to receive a channel state information (CSI) reported by a user equipment (UE); the processor is configured to determine manners for deriving the CSI by the UE; the processor is specifically configured to:

the base station determines that the UE derives the CSI based on an unrestricted observation interval, if the CSI is a periodic CSI; the base station determines that the UE derives the CSI based on a restricted observation interval, if the CSI is an aperiodic CSI;

or specifically configured to:

the base station determines that the UE derives the CSI based on an unrestricted observation interval, if the UE is configured with at least two CSI processes; the base station determines that the UE derives the CSI based on a restricted observation interval, if the UE is configured with one CSI process or the UE merely possesses a capability of supporting one CSI process;

or specifically configured to:

the base station determines that the UE derives the CSI based on a restricted observation interval, if the UE is configured with one CSI process or the UE merely possesses a capability of supporting one CSI process, and the CSI is an aperiodic CSI;

or specifically configured to:

the base station determines that the UE derives the CSI according to a manner indicated in a high layer signaling transmitted by the base station;

or specifically configured to:

the base station determines that the UE derives the CSI based on an observation interval indicated in a high layer signaling transmitted by the base station;

or specifically configured to:

the base station acquires the manner for deriving the CSI by the UE according to a received manner for deriving the CSI reported by the UE.

Embodiments of the present disclosure provide a method for reporting channel state information, a user equipment and a base station. A channel state information measurement resource is determined by a UE according to an aperiodic CSI trigger signaling, so that a base station transmits a CSI-RS only when the UE needs to report the aperiodic CSI. Compared with transmitting a periodic CSI-RS by an existing base station, unnecessary transmitting of the CSI-RS is reduced, and energy of the base station such as an eNB is saved; and reducing the CSI-RS transmission may reduce resources occupied by the CSI-RS, thereby improving the spectrum efficiency of the system. In addition, reducing unnecessary CSI-RS transmission allows the interference in other cells by the base station being reduced; finally, CSI measurement resources are reserved only when the CSI needs to be fed back, the cost occupied by the CSI measurement resources is reduced, thereby improving the spectrum efficiency of the system.

DESCRIPTION OF EMBODIMENTS

A method for reporting channel state information is described in detail hereunder according to Embodiment 1.

Embodiment 1

Figure 1:
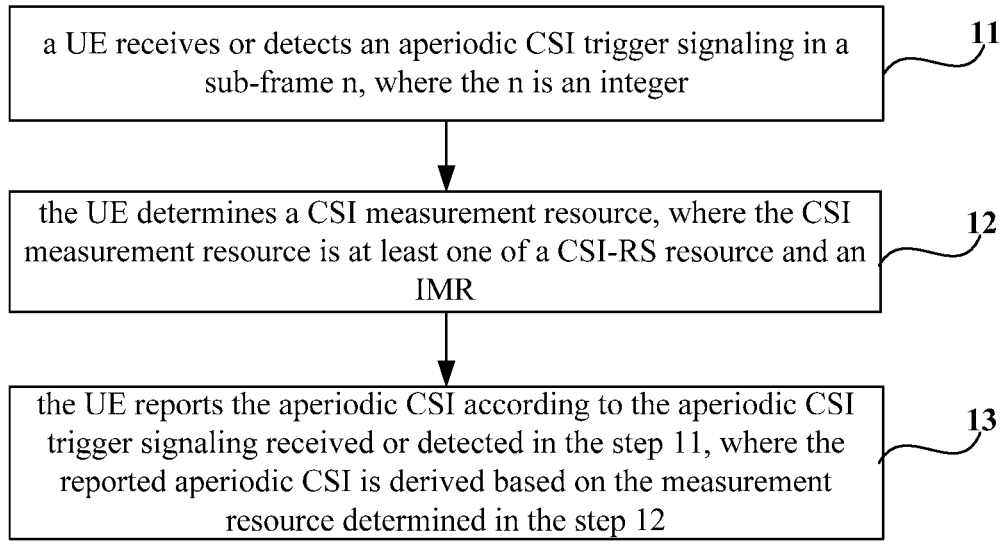
FIG. 1 is a flow chart of a method for reporting channel state information according to Embodiment 1 of the present disclosure.

This embodiment specifically describes a method for reporting channel state information from a UE side. As shown in FIG. 1, the method according to this embodiment includes several steps as follows:

Step 11: a UE receives or detects an aperiodic CSI trigger signaling in a sub-frame n, where the n is an integer.

In this step, the aperiodic CSI trigger signaling may be carried by a physical downlink control channel (PDCCH) or an enhanced physical downlink control channel (EPDCCH), and may also be carried by a physical downlink shared channel (PDSCH), at this moment, the PDSCH corresponds to a random access response grant, or a base station transmits the aperiodic CSI trigger signaling to the user equipment through other forms.

When the aperiodic CSI trigger signaling is carried by a PDCCH or an EPDCCH, a cyclic redundancy check (CRC) of the PDCCH or the EPDCCH may be scrambled through a cell radio network temporary identifier (C-RNTI), and may also be scrambled through a multi-user shared RNTI. The multi-user shared radio network temporary identifier (RNTI) may be a CSI-RNTI.

The format of the downlink control information (DCI) corresponding to the PDCCH or the EPDCCH may be any one or combination of format 0 or format 4, and may also be a new preset format.

When the CRC of the PDCCH or the EPDCCH may be scrambled by the multi-user shared RNTI, a first domain used for indicating whether a UE needs to report an aperiodic CSI may be included in a new format of the DCI. The first domain may respectively indicate whether each user in a group of users needs to report an aperiodic CSI, e.g., it may be determined through a intra-group index of each UE and a value of the domain. A second domain may also be included in the new format, where the second domain is used for indicating a measurement resource of the CSI, namely a CSI measurement resource. Please refer to the description in step 12 for details. The DCI as a whole may be considered as the aperiodic CSI trigger signaling.

Step 12, the UE determines a CSI measurement resource, where the CSI measurement resource is at least one of a CSI-RS resource and an interference measurement resource (Interference Measurement Resource, IMR).

The CSI-RS resource may refer to a resource transmitting non-zero power CSI-RS, may include the number of CSI-RS antenna port, CSI-RS configuration, and a sub-frame transmitting the non-zero power CSI-RS, etc. The CSI-RS configuration may indicate the position of a resource element (RE) occupied in a sub-frame by the CSI-RS. The IMR may also be called as a channel state information interference measurement (CSI-IM) resource, which refers to a resource carrying zero power CSI-RS, and may include information such as a zero power CSI-RS configuration and a sub-frame carrying the zero power CSI-RS. The zero power CSI-RS configuration may indicate the position of a resource element (RE) occupied in the sub-frame by the zero power CSI-RS.

In embodiments of the present disclosure, after the UE receives or detects the aperiodic CSI trigger signaling in the sub-frame n, the UE determines the CSI measurement resource according to the trigger signaling firstly, if it is determined that the aperiodic CSI needs to be reported. The determining at least one of the sub-frame transmitting non-zero power CSI-RS and the sub-frame carrying zero power CSI-RS, may be realized according to any one of the following manners.

Manner 1: at least one of a sub-frame n and a sub-frame n+1 is determined as at least one of a sub-frame transmitting non-zero power CSI-RS and a sub-frame carrying zero power CSI-RS.

Manner 2: sub-frames from a sub-frame n to a sub-frame n+k1 are determined as at least one of a sub-frame transmitting non-zero power CSI-RS and a sub-frame carrying zero power CSI-RS; where, k1 is an integer greater than or equal to 2.

Manner 3: a sub-frame n−k2 and a sub-frame n are determined as at least one of a sub-frame transmitting non-zero power CSI-RS and a sub-frame carrying zero power CSI-RS, where, k2 is an integer greater than or equal to 1;

In the manner 3, since the UE can not predict when the aperiodic CSI trigger signaling can be received, i.e., the UE does not know which sub-frame will has any one or a combination of the CSI-RS and the zero power CSI-RS, therefore the UE needs to store a downlink data of last k2+1 sub-frames. Compared with manner 2, the manner 3 has an advantage of not delaying aperiodic CSI reporting.

Manner 4: a sub-frame n−k3 and a sub-frame n+k4 are determined as at least one of a sub-frame transmitting non-zero power CSI-RS and a sub-frame carrying zero power CSI-RS, where, k3 is an integer greater than or equal to 1, and k4 is an integer greater than or equal to 1.

Manner 5: a sub-frame n+k5 is determined as at least one of a sub-frame transmitting non-zero power CSI-RS and a sub-frame carrying zero power CSI-RS, where k5 is an integer greater than or equal to 0, and the sub-frame n+k5 is the first available sub-frame transmitting non-zero power CSI-RS and/or carrying zero power CSI-RS, i.e., the sub-frame n+k5 is the first available sub-frame transmitting non-zero power CSI-RS, or the first available sub-frame carrying zero power CSI-RS, or the first available sub-frame transmitting non-zero power CSI-RS and carrying zero power CSI-RS.

In the manner 5, the first available sub-frame transmitting non-zero power CSI-RS and/or carrying zero power CSI-RS, may be at least one of a sub-frame possibly transmitting non-zero power CSI-RS and a sub-frame possibly carrying zero power CSI-RS that determined by a UE in the time domain according to the sub-frame configuration information indicated in a high layer signaling configuration information, and at least one of a sub-frame actually transmitting non-zero power CSI-RS and a sub-frame actually carrying zero power CSI-RS that then determined by the UE according to an aperiodic CSI trigger signaling, i.e., the time domain position of the CSI measurement resource is then determined by the UE according to the aperiodic CSI trigger signaling. The high layer signaling configuration information may indicate information such as a time domain, a frequency domain, and an antenna port of the measurement resource. Specifically, if the UE receives an aperiodic CSI trigger signaling in the sub-frame n, and needs to report an aperiodic CSI according to the indication of the aperiodic CSI trigger signaling, then the UE determines the first sub-frame possibly transmitting non-zero power CSI-RS and/or e carrying zero power CSI-RS behind the sub-frame n (including the sub-frame n), as at least one of a sub-frame transmitting non-zero power CSI-RS and a sub-frame carrying zero power CSI-RS.

Manner 6: a sub-frame n−k6 is determined as at least one of a sub-frame transmitting non-zero power CSI-RS and a sub-frame carrying zero power CSI-RS. Where, k6 is an integer greater than or equal to 0, and the sub-frame n−k6 is the first available sub-frame transmitting non-zero power CSI-RS and/or carrying zero power CSI-RS ahead of a sub-frame n (including the sub-frame n), i.e., the sub-frame n−k6 is the first available sub-frame transmitting non-zero power CSI-RS, the first available sub-frame carrying zero power CSI-RS, or the first available sub-frame transmitting non-zero power CSI-RS and carrying zero power CSI-RS.

In the manner 6, the UE determines at least one of a sub-frame possibly transmitting non-zero power CSI-RS and a sub-frame possibly carrying zero power CSI-RS in the time domain according to the sub-frame configuration information in the high layer signaling configuration information, and then determines at least one of a sub-frame actually transmitting non-zero power CSI-RS and a sub-frame actually carrying zero power CSI-RS according to the aperiodic CSI trigger signaling, i.e., the UE then determines a time domain position of a measurement resource carrying channel state information according to the aperiodic CSI trigger signaling. Specifically, if the UE receives or detects an aperiodic CSI trigger signaling in the sub-frame n, and needs to report an aperiodic CSI according to the indication of the aperiodic CSI trigger signaling, then the UE determines at least one of a first sub-frame possibly transmitting non-zero power CSI-RS and a sub-frame possibly carrying zero power CSI-RS ahead of a sub-frame n (including the sub-frame n), as at least one of a sub-frame transmitting non-zero power CSI-RS and a sub-frame carrying zero power CSI-RS. In the manner 6, since the UE cannot predict when the aperiodic CSI trigger signaling can be received, thus the UE does not know which sub-frame will has any one or a combination of the non-zero power CSI-RS and the zero power CSI-RS, therefore, the UE needs to store a downlink data of any one or a combination of the last sub-frame possibly transmitting non-zero power CSI-RS and the last sub-frame possibly carrying zero power CSI-RS.

Manner 7: successive k7 sub-frames including a sub-frame n are determined as at least one of a sub-frame transmitting non-zero power CSI-RS and a sub-frame carrying zero power CSI-RS. Where, k7 is an integer greater than or equal to 2.

In the manner 7, the UE determines at least one of a sub-frame possibly transmitting non-zero power CSI-RS and a sub-frame possibly carrying zero power CSI-RS in the time domain according to the sub-frame configuration information in the high layer signaling configuration information, and then determines at least one of a sub-frame actually transmitting non-zero power CSI-RS and a sub-frame actually carrying zero power CSI-RS according to the aperiodic CSI trigger signaling, i.e., the UE then determines a time domain position of a measurement resource carrying channel state information according to the aperiodic CSI trigger signaling. Specifically, if the UE receives an aperiodic CSI trigger signaling in the sub-frame n, and needs to report an aperiodic CSI according to the indication of the aperiodic CSI trigger signaling, then the UE determines k7 sub-frames ahead of the sub-frame n (including the sub-frame n), where each of the k7 sub-frames is at least one of a sub-frame possibly transmitting non-zero power CSI-RS and a sub-frame possibly carrying zero power CSI-RS; or the UE determines k7 sub-frames behind the sub-frame n (including the sub-frame n), where each of the k7 sub-frames is at least one of a sub-frame possibly transmitting non-zero power CSI-RS and a sub-frame possibly carrying zero power CSI-RS; or a UE determines kp sub-frames ahead of the sub-frame n (including the sub-frame n) and ka sub-frames behind the sub-frame n, where kp+ka=k7, and each of the kp and ka sub-frames is at least one of a sub-frame possibly transmitting non-zero power CSI-RS and a sub-frame possibly carrying zero power CSI-RS.

All the above seven manners are for determining the time domain position of the channel state information measurement resource, i.e., determining at least one of a sub-frame transmitting non-zero power CSI-RS and a sub-frame carrying zero power CSI-RS.

In the step 12, according to measurement resource configuration indication information, the UE may further determine information such as the number of CSI-RS antenna port, CSI-RS configuration and zero power CSI-RS configuration. The measurement resource configuration indication information is semi-statically configured for the user equipment by a base station, and the measurement resource configuration indication information may include information such as an antenna port and a resource configuration index, but exclude the sub-frame configuration information. The resource configuration index is used for indicating patterns of the non-zero power CSI-RS and the zero power CSI-RS in a determined sub-frame.

Manner 8: a UE determines a CSI resource indicated by the above second domain as a CSI measurement resource. That is to say, the UE determines the CSI measurement resource according to information in the aperiodic CSI trigger signaling received by the UE in the sub-frame n.

In the step 12, the CSI measurement resource indicated by the second domain in the aperiodic CSI trigger signaling, may indicate all the CSI measurement resources, i.e., may include indication information such as the antenna port, the time domain and frequency domain positions; or may include information indicating the antenna port and frequency domain position only, at this time, information of the time domain position of the CSI measurement resource may be derived by applying any one of the foregoing manners from manner 1 to manner 7.

In each of the foregoing manners, a reference resource of the aperiodic CSI may be at least one of a sub-frame transmitting non-zero power CSI-RS and a sub-frame carrying zero power CSI-RS, and may also be a middle sub-frame located between two CSI measurement resource sub-frames. The reference resource of the aperiodic CSI may be specifically a reference sub-frame of the aperiodic CSI.

Step 13, the UE reports the aperiodic CSI according to the aperiodic CSI trigger signaling received or detected in the step 11, where the reported aperiodic CSI is derived based on the measurement resource determined in the step 12.

The UE determines to report the aperiodic CSI according to the received or detected aperiodic CSI trigger signaling, i.e., the UE executes the step 12 to determine the a CSI measurement resource after determining that the aperiodic CSI needs to be reported according to the above first domain. Then, the UE executes the step 13, measures the channel state based on the determined CSI measurement resource, derives a CSI and reports the CSI to a base station.

In embodiments of the present disclosure, reporting the aperiodic CSI may also be realized according to any one of manners as follows.

Manner 1: the UE determines a physical uplink shared channel (PUSCH) resource according to the received aperiodic CSI trigger signaling, and reports the aperiodic CSI on the determined PUSCH resource.

In this manner, the UE determines the PUSCH resource for transmitting the aperiodic CSI according to the received aperiodic CSI trigger signaling, and then reports the aperiodic CSI on the determined PUSCH resource.

When the aperiodic CSI trigger signaling corresponds to a group of UE, the PUSCH resource indicated by the aperiodic CSI trigger signaling may be assigned to a specific UE in the group of UEs, for example, the specific UE may be a UE with a minimum intra-group user index in the group of UEs. An initial position of the PUSCH resources of other UEs in the group may be an offset of the initial position of the PUSCH resource indicated by the aperiodic CSI trigger signaling, the offset value may be determined by the intra-group user index. An RB number of the PUSCH resource of other UEs in the group is consistent with an RB number of the PUSCH resource indicated by the aperiodic CSI trigger signaling. The PUSCH resource of other UEs in the group may also be reserved semi-statically.

Manner 2: the UE reports the aperiodic CSI on a semi-statically reserved PUSCH resource.

In the manner 2, the UE reports the aperiodic CSI on the PUSCH resource semi-statically reserved by the base station for the UE.

In the step 13, if the UE receives the aperiodic CSI trigger signaling in a sub-frame n, and determines that the aperiodic CSI needs to be reported according to the aperiodic CSI trigger signaling, then the UE will report the aperiodic CSI in a sub-frame n+t according to the received aperiodic CSI trigger signaling. The value of t is greater than or equal to 4, specifically:

If the determined CSI-RS resource and/or interference measurement resource include(s) a sub-frame n+1, the value of t is 5 when in a frequency division duplexing (FDD): also known as a full duplexing mode; the value of t is t1+1 when in a time division duplexing (TDD) mode, where the value of t1 is determined according to a TDD ratio.

If the determined at least one of a sub-frame transmitting non-zero power CSI-RS and a sub-frame carrying zero power CSI-RS is the sub-frame n, the value of t is 4 when in the FDD mode; the value of t is t1 when in the TDD mode, where the value of t1 is determined according to the TDD ratio.

In embodiments of the present disclosure, the reported CSI mainly targets at the aperiodic CSI, i.e., the measurement of the aperiodic CSI may be derived based on the channel state information measurement resource determined in embodiments of the present disclosure. When the UE employs the method according to embodiments of the present disclosure to realize reporting of an aperiodic CSI, the UE may not report a periodic CSI, at this time, it may be that only the transmitting of the aperiodic non-zero power CSI-RS and/or the reservation of an aperiodic interference measurement resource present on a downlink carrier corresponding to the aperiodic CSI, or it may be that, on all the downlink carriers of the UE, there is no transmitting of a periodic non-zero power CSI-RS and/or a reservation of a periodic interference measurement resource present, and only the transmitting of the aperiodic non-zero power CSI-RS and/or the reservation of the aperiodic interference measurement resource present. Additionally, when the UE employs the method according to embodiments of the present disclosure to realize reporting of an aperiodic CSI, the UE may also report a periodic CSI, where the periodic CSI may be derived depending on the periodically transmitted non-zero power CSI-RS and/or the periodically reserved interference measurement resource. At this time, the periodically transmitted non-zero power CSI-RS and/or the periodically reserved interference measurement resource and the aperiodically transmitted non-zero power CSI-RS and/or the aperiodically reserved interference measurement resource may correspond to the same downlink carrier (i.e., both of them are transmitted or reserved on the same downlink carrier), and may also correspond to different downlink carriers. The periodic non-zero power CSI-RS may also be used for an RRM measurement, and periods of the periodic non-zero power CSI-RS and the interference resource may be relatively long.

When the periodically transmitted non-zero power CSI-RS and/or the periodically reserved interference measurement resource and the aperiodically transmitted non-zero power CSI-RS and/or the aperiodically reserved interference measurement resource correspond to the same downlink carrier, a periodic non-zero power CSI-RS may be configured for the UE, and an aperiodic non-zero power CSI-RS is also transmitted on the downlink carrier simultaneously. At this time, the aperiodic non-zero power CSI-RS may be only used for the measurement of the aperiodic CSI; the periodic non-zero power CSI-RS may be used for the measurement of the periodic CSI, and may also be used for measurements of a reference signal received power (RSRP) and/or a reference signal received quality (RSRQ) simultaneously, the period of the periodic non-zero power CSI-RS may be relatively long. The number of the antenna ports corresponding to the periodic non-zero power CSI-RS and the number of the antenna ports corresponding to the aperiodic non-zero power CSI-RS may be inconsistent, for example, the periodic non-zero power CSI-RS corresponds to an antenna port 15, the aperiodic non-zero power CSI-RS corresponds to the antenna port 15 and an antenna port 16. Frequency domain positions of the periodic non-zero power CSI-RS and the aperiodic non-zero power CSI-RS within the sub-frame may be inconsistent, i.e., CSI-RS configurations corresponding to the periodic non-zero power CSI-RS and the aperiodic non-zero power CSI-RS may be inconsistent. As for the UE, only a part (e.g., a single antenna port 15) of the antenna ports corresponding to the non-zero power CSI-RS correspond to the periodic non-zero power CSI-RS, i.e., only part of the antenna ports corresponds to the periodic CSI feedback; the antenna port corresponding to the aperiodic CSI feedback may include the antenna port corresponding to the periodic CSI, and may also be totally inconsistent with the antenna port corresponding to the periodic CSI. At this time, when the channel state information measurement resource in the step 12 of embodiments of the present disclosure is a non-zero power CSI-RS resource, the number of the antenna ports corresponding to the aperiodic non-zero power CSI-RS resource is larger than the number of the antenna ports corresponding to the periodic non-zero power CSI-RS resource, or the antenna ports corresponding to the aperiodic non-zero power CSI-RS resource includes the antenna port corresponding to the periodic non-zero power CSI-RS resource (e.g., the periodic non-zero power CSI-RS resource corresponds to the antenna port 15, the aperiodic non-zero power CSI-RS resource corresponds to the antenna port 15 and the antenna port 16), or the antenna port corresponding to the aperiodic non-zero power CSI-RS resource is inconsistent with the antenna port corresponding to the periodic non-zero power CSI-RS resource. At this time, although a periodic non-zero power CSI-RS also presents, beneficial effects of embodiments of the present disclosure can also be obtained likewise. For example, at this time, the period of periodic non-zero power CSI-RS may be set very long, which is mainly dependent on the aperiodic non-zero power CSI-RS, therefore, beneficial effects of embodiments of the present disclosure can be obtained. For another example, at this time, the periodic non-zero power CSI-RS merely corresponds to limited antenna port, and the aperiodic non-zero power CSI-RS may correspond to more antenna ports, therefore, beneficial effects according to embodiments of the present disclosure may also be obtained, because if all the antenna ports use the periodic non-zero power CSI-RS, the consumption would be more from whichever aspect of resource cost or energy saving.

In the above embodiment, a channel state information measurement resource is determined by a UE according to an aperiodic CSI trigger signaling, so that a base station transmits a CSI-RS only when the UE needs to report the aperiodic CSI. Compared with transmitting a periodic CSI-RS by an existing base station, unnecessary transmitting of the CSI-RS is reduced, and energy of the base station such as an eNB is saved; and reducing the CSI-RS transmission may reduce resources occupied by the CSI-RS, thereby improving the spectrum efficiency of the system. In addition, reducing unnecessary CSI-RS transmission allows the interference in other cells by the base station being reduced; finally, CSI measurement resources are reserved only when the CSI needs to be fed back, the cost occupied by the CSI measurement resources is reduced, thereby improving the spectrum efficiency of the system.

A method for reporting channel state information is described in detail hereunder according to Embodiment 2.

Embodiment 2

Figure 2:
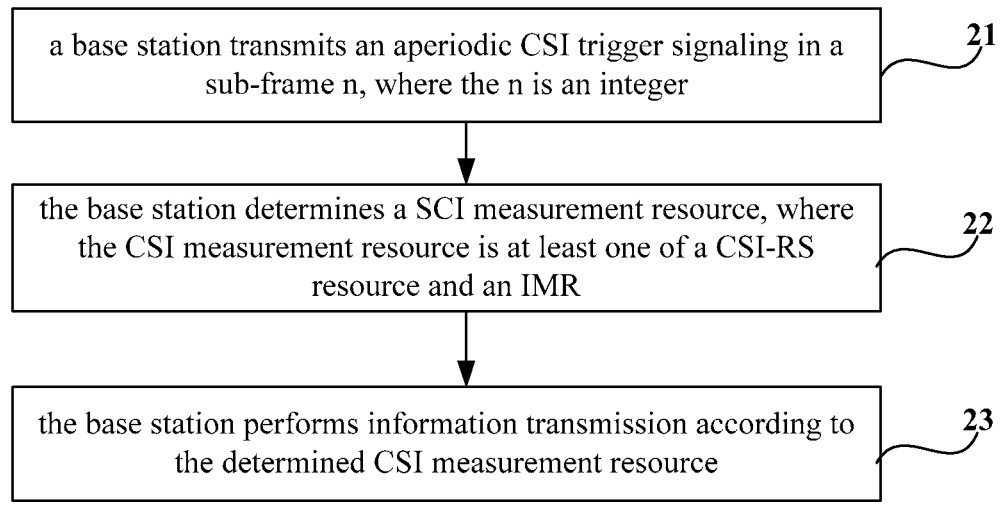
FIG. 2 is a flow chart of a method for reporting channel state information according to Embodiment 2 of the present disclosure.

This embodiment specifically describes a method for reporting channel state information from a base station side. As shown in FIG. 2, the method according to this embodiment mainly includes several steps as follows:

Step 21: a base station transmits an aperiodic CSI trigger signaling in a sub-frame n, where the n is an integer.

In the step 21, the base station transmits an aperiodic CSI trigger signaling to a UE. For the aperiodic CSI trigger signaling, please refer to the description of step 11 in Embodiment 1 for details, the aperiodic CSI trigger signaling may be carried by a PDCCH or a EPDCCH, or may be carried by a PDSCH. A CRC of the PDCCH or the EPDCCH may be scrambled by a C-RNTI or a multi-user shared RNTI. The multi-user shared RNTI may be a CSI-RNTI. The format of a DCI corresponding to the PDCCH or the EPDCCH may be any one or combination of format 0 or format 4. The format of the DCI corresponding to the PDCCH or the EPDCCH may also be a new preset format. The new format may include a first domain used for indicating whether a UE reports an aperiodic CSI. Further, the new format may also include a second domain, where the second domain is used for indicating the CSI measurement resource. For the CSI measurement resource, please refer to the description of step 12 in Embodiment 1 for details, which may refer to any one or combination of a non-zero power CSI resource and any one kind of resource in IMR.

Step 22, the base station determines a CSI measurement resource, where the CSI measurement resource is at least one of a CSI-RS resource and an IMR.

In the step 22, the base station determines the CSI measurement resource, which may refer to that the base station determines any one or combination of the CSI-RS resource and the IMR. This step may be realized by employing any one of manners from manner 1 to manner 7 in step 12 of Embodiment 1. Specifically:

if the base station transmits an aperiodic CSI trigger signaling in the sub-frame n, at least one of the sub-frame n and a sub-frame n+1 is determined as at least one of a sub-frame transmitting non-zero power CSI-RS and a sub-frame carrying zero power CSI-RS;

or, if the base station transmits an aperiodic CSI trigger signaling in the sub-frame n, sub-frames from the sub-frame n to a sub-frame n+k1 are determined as at least one of a sub-frame transmitting non-zero power CSI-RS and a sub-frame carrying zero power CSI-RS; where, k1 is an integer greater than or equal to 2;

or, if the base station transmits an aperiodic CSI trigger signaling in the sub-frame n, a sub-frame n−k2 and the sub-frame n are determined as at least one of a sub-frame transmitting non-zero power CSI-RS and a sub-frame carrying zero power CSI-RS; where, k2 is an integer greater than or equal to 1;

or, if the base station transmits an aperiodic CSI trigger signaling in the sub-frame n, a sub-frame n−k3 and a sub-frame n+k4 are determined as at least one of a sub-frame transmitting non-zero power CSI-RS and a sub-frame carrying zero power CSI-RS; where, both k3 and k4 are integers greater than or equal to 1;

or, if the base station transmits an aperiodic CSI trigger signaling in the sub-frame n, a sub-frame n+k5 is determined as at least one of a sub-frame transmitting non-zero power CSI-RS and a sub-frame carrying zero power CSI-RS, and the sub-frame n+k5 is the first available sub-frame transmitting non-zero power CSI-RS and/or carrying zero power CSI-RS, i.e., the sub-frame n+k5 is the first available sub-frame transmitting non-zero power CSI-RS, the first available sub-frame carrying zero power CSI-RS, or the first available sub-frame transmitting non-zero power CSI-RS and carrying zero power CSI-RS; where, k5 is an integer greater than or equal to 0;

or, if the base station transmits an aperiodic CSI trigger signaling in the sub-frame n, a sub-frame n−k6 is determined as at least one of a sub-frame transmitting non-zero power CSI-RS and a sub-frame carrying zero power CSI-RS, and the sub-frame n−k6 is the first available sub-frame transmitting non-zero power CSI-RS and/or carrying zero power CSI-RS ahead of a sub-frame n (including the sub-frame n), i.e., the sub-frame n−k6 is the first available sub-frame transmitting non-zero power CSI-RS, the first available sub-frame carrying zero power CSI-RS, or the first available sub-frame transmitting non-zero power CSI-RS and carrying zero power CSI-RS; where, k6 is an integer greater than or equal to 0.

or, if the base station transmits an aperiodic CSI trigger signaling in the sub-frame n, successive k7 sub-frames including the sub-frame n are determined as at least one of a sub-frame transmitting non-zero power CSI-RS and a sub-frame carrying zero power CSI-RS; where, k7 is an integer greater than or equal to 2. For the description of the k7 sub-frames, please refer to the manner 7 in Embodiment 1, and details will not be repeated herein.

For example, the base station determines at least one of the sub-frame n and the sub-frame n+1 as at least one of the sub-frame transmitting non-zero power CSI-RS and the sub-frame carrying zero power CSI-RS.

Step 23, the base station performs information transmission according to the determined CSI measurement resource.

In the step 23, the base station performs information transmission according to the determined CSI measurement resource, which may refer to that the base station transmits a non-zero power CSI-RS and/or reserves an interference measurement resource according to the determined CSI measurement resource, so that the UE derives the aperiodic CSI based on the CSI measurement resource; and may also refer to that the base station performs a PDSCH and/or downlink control channel transmission according to the determined CSI measurement resource.

For example, in the step 23, the base station transmits a CSI-RS according to the determined CSI-RS resource, that is to say, the base station transmits the CSI-RS in a CSI-RS sub-frame determined in the step 22. For another example, it may also be that: the base station transmits a PDSCH according to the determined resource, that is to say, when executing a PDSCH mapping, the base station avoids a resource element used for transmitting the CSI-RS and/or a resource element occupied by an interference measurement resource, according to the determined resource.

In the step 23, the performing the information transmission according to the determined CSI measurement resource, may also include: deriving at least one of a sub-frame transmitting non-zero power CSI-RS and a sub-frame carrying zero power CSI-RS according to the determined CSI measurement resource, when transmitting a PDCCH and/or EPDCCH carrying a downlink assignment in these sub-frames, the CRC of the PDCCH and/or EPDCCH is scrambled through a set RNTI (may be referred as a first RNTI), the set RNTI is different from a RNTI (may be referred as a second RNTI) used in at least one of a sub-frame not transmitting non-zero power CSI-RS and a sub-frame not carrying zero power CSI-RS. The set RNTI may be a CSIRS-RNTI.

In the above embodiment, a base station determines a CSI measurement resource and performs information transmission according to the determined CSI measurement resource, so that the base station transmits a CSI-RS only when a UE needs to report an aperiodic CSI. Compared with transmitting a periodic CSI-RS by an existing base station, unnecessary transmitting of the CSI-RS is reduced, and energy of the base station such as an eNB is saved; and reducing the CSI-RS transmission may reduce resources occupied by the CSI-RS, thereby improving the spectrum efficiency of the system. In addition, reducing unnecessary CSI-RS transmission allows the interference in other cells by the base station being reduced; finally, CSI measurement resources are reserved only when the CSI needs to be fed back, the cost occupied by the CSI measurement resources is reduced, thereby improving the spectrum efficiency of the system.

A method for information transmission is described in detail hereunder according to Embodiment 3.

Embodiment 3

Figure 3:
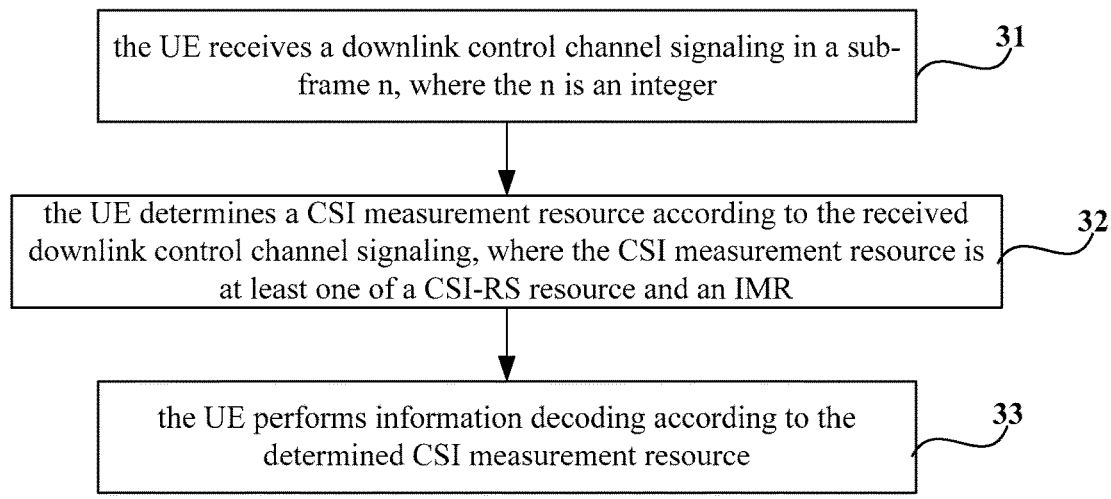
FIG. 3 is a flow chart of a method for information transmission according to Embodiment 3 of the present disclosure.

In this embodiment, a UE does not need to feedback a CSI, but the UE still needs to acquire a CSI measurement resource, so as to avoid these resources when transmitting signals or information in these sub-frames. As shown in FIG. 3, the method for acquiring the CSI measurement resource includes the following steps mainly:

Step 31, the UE receives a downlink control channel signaling in a sub-frame n, where the n is an integer.

In the step 31, the UE receives a downlink control channel signaling in a sub-frame n, which may refer to that the downlink control channel signaling is received in the sub-frame n by the UE. The downlink control channel signaling may be carried by the PDCCH or the EPDCCH. The downlink control channel signaling in this step may be downlink assignment (DL assignment) information, and may also be an uplink assignment information, such as an aperiodic CSI trigger signaling, which is not limited in this embodiment.

Step 32, the UE determines a CSI measurement resource according to the received downlink control channel signaling. For the CSI measurement resource, please refer to the description in the step 12 in Embodiment 1 for details, which is at least one of a CSI-RS resource and an IMR.

In the step 32, the user equipment determines the CSI measurement resource according to the received downlink control channel signaling, specifically, it may be that the user equipment determines at least one of a sub-frame transmitting non-zero power CSI-RS and a sub-frame carrying zero power CSI-RS according to the received downlink control channel signaling. The downlink control channel signaling may be carried by a PDCCH or an EPDCCH, the UE may determine the CSI measurement resource according to an RNTI by which the CRC of the PDCCH or the EPDCCH is scrambled. Specifically, it may be realized according to any one of the manners as follows.

Manner 1: if the CRC of the PDCCH or the EPDCCH is scrambled by a set RNTI, a sub-frame n is determined as at least one of a sub-frame transmitting non-zero power CSI-RS and a sub-frame carrying zero power CSI-RS.

In this manner, if the CRC of the PDCCH or the EPDCCH is scrambled by the set RNTI (may be referred as a first RNTI), it is determined that the sub-frame n carries a CSI measurement resource, for example, it is determined that the sub-frame carries a CSI-RS resource, i.e., there is the CSI-RS transmission in the sub-frame n. The set RNTI is different from an RNTI (may be referred as a second RNTI) used in a sub-frame not transmitting non-zero power CSI-RS and not carrying zero power CSI-RS, meanwhile values of set RNTIs for different users in a same cell are different. At this time, the downlink control channel signaling is downlink assignment information, i.e., used for scheduling the PDSCH data. The set RNTI may be a CSIRS-RNTI.

Manner 2: The downlink control channel signaling is uplink assignment information—aperiodic CSI trigger signaling. The aperiodic CSI trigger signaling may be carried by the PDCCH or the EPDCCH, the CRC of the PDCCH or the EPDCCH is scrambled by a specific RNTI. The specific RNTI may be a CSI-RNTI, and the specific RNTI may also be shared by a group of users.

If the aperiodic CSI trigger signaling is detected by the UE in the sub-frame n, the UE may determine the CSI measurement resource according to manners in the step 12 of Embodiment 1. Specifically, for example:

if the aperiodic CSI trigger signaling is received or detected by the UE in the sub-frame n, at least one of the sub-frame n and a sub-frame n+1 is determined as at least one of a sub-frame transmitting non-zero power CSI-RS and a sub-frame carrying zero power CSI-RS;

or, if the aperiodic CSI trigger signaling is received or detected by the UE in the sub-frame n, sub-frames from the sub-frame n to a sub-frame n+k1 are determined as at least one of a sub-frame transmitting non-zero power CSI-RS and a sub-frame carrying zero power CSI-RS; where, k1 is an integer greater than or equal to 2;

or, if the aperiodic CSI trigger signaling is received or detected by the UE in the sub-frame n, a sub-frame n−k2 and the sub-frame n are determined as at least one of a sub-frame transmitting non-zero power CSI-RS and a sub-frame carrying zero power CSI-RS; where, k2 is an integer greater than or equal to 1;

or, if the aperiodic CSI trigger signaling is received or detected by the UE in the sub-frame n, a sub-frame n−k3 and a sub-frame n+k4 are determined as at least one of a sub-frame transmitting non-zero power CSI-RS and a sub-frame carrying zero power CSI-RS; where, both k3 and k4 are integers greater than or equal to 1;

or, if the aperiodic CSI trigger signaling is received or detected by the UE in the sub-frame n, a sub-frame n+k5 is determined as at least one of a sub-frame transmitting non-zero power CSI-RS and a sub-frame carrying zero power CSI-RS, and the sub-frame n+k5 is the first available sub-frame transmitting non-zero power CSI-RS and/or carrying zero power CSI-RS; where, k5 is an integer greater than or equal to 0;

or, if the aperiodic CSI trigger signaling is received or detected by the UE in the sub-frame n, a sub-frame n−k6 is determined as at least one of a sub-frame transmitting non-zero power CSI-RS and a sub-frame carrying zero power CSI-RS, and the sub-frame n−k6 is the first available sub-frame transmitting non-zero power CSI-RS and/or carrying zero power CSI-RS ahead of a sub-frame n (including the sub-frame n); where, k6 is an integer greater than or equal to 0;

or, if the aperiodic CSI trigger signaling is received or detected by the UE in the sub-frame n, successive k7 sub-frames including the sub-frame n are determined as at least one of a sub-frame transmitting non-zero power CSI-RS and a sub-frame carrying zero power CSI-RS; where, k7 is an integer greater than or equal to 2;

or, at least one of a sub-frame transmitting non-zero power CSI-RS and a sub-frame carrying zero power CSI-RS is determined according to information indicated in the downlink control channel signaling.

Please refer to Embodiment 1 for descriptions to each of the above manners, and details will not be repeated herein.

For example, when the UE determines at least one of the sub-frame n and the sub-frame n+1 as at least one of a sub-frame transmitting non-zero power CSI-RS and a sub-frame carrying zero power CSI-RS, it may refer to transmitting a non-zero power CSI-RS and/or reserving an interference measurement resource in at least one of the sub-frame n and the sub-frame n+1.

Step 33, the UE performs information decoding according to the determined CSI measurement resource.

In the step 33, the UE derives at least one of a sub-frame transmitting non-zero power CSI-RS and a sub-frame carrying zero power CSI-RS according to the determined CSI measurement resource, so that the UE can perform operations such as a de-rate-matching for a PDSCH and/or a physical downlink control channel according to resources occupied by the CSI measurement resource, when a decoding is performed for the PDSCH and/or the physical downlink control channel in these sub-frames.

In the above embodiment, a UE determines a CSI measurement resource according to a received downlink control channel signaling, so that the base station transmits a CSI-RS only when the UE needs to report an aperiodic CSI. Compared with transmitting a periodic CSI-RS by an existing base station, unnecessary transmitting of the CSI-RS is reduced, and energy of the base station such as an eNB is saved; and reducing the CSI-RS transmission may reduce resources occupied by the CSI-RS, thereby improving the spectrum efficiency of the system. In addition, reducing unnecessary CSI-RS transmission allows the interference in other cells by the base station being reduced; finally, CSI measurement resources are reserved only when the CSI needs to be fed back, the cost occupied by the CSI measurement resources is reduced, thereby improving the spectrum efficiency of the system.

It should be noted that the method according to the above embodiment may be used not only in a backward-compatible carrier, but also in a new carrier type (NCT) which might be introduced in the LTE Rel-11 and the subsequent versions. The new carrier type is a non-backward-compatible carrier, the design of the new carrier type may do not have backward compatibility.

Another method for reporting channel state information is described in detail hereunder according to Embodiment 4.

Embodiment 4

This embodiment targets at a UE which is merely configured with one CSI process because of reasons such as capacity restrictions, so as to describe in detail about the another method for reporting channel state information.

In the Rel-8/9/10 system, the CSI reporting is divided into the periodic CSI reporting and the aperiodic CSI reporting. For the periodic CSI reporting, the user equipment will report the CSI periodically according to a reporting period and a subframe offset configured by the high layer; for the aperiodic CSI reporting, if an aperiodic CSI trigger signaling is received by the user equipment, the user equipment reports the aperiodic CSI. No matter for the periodic CSI reporting or the aperiodic CSI reporting, an observation interval of a CSI, which is reported in an uplink sub-frame n, in time domain and frequency domain is not limited, e.g., a UE may average measured channels and/or interferences based on a plurality of sub-frames and/or a plurality of sub-bands so as to derive the CSI, and report to a base station. The UE may also derive the CSI based on channels and/or interferences of one sub-frame and/or one sub-band merely, and report to the base station. When the base station receives the CSI reported by the UE, the base station does not know whether the reported CSI is derived by averaging the channels and/or interferences based on a plurality of sub-frames and/or a plurality of sub-bands, or the reported CSI is derived based on the channels and/or interferences of one sub-frame and/or one sub-band merely. Moreover, when the UE employs an averaging method to derive a CSI, the reported CSI can only represent an average channel characteristic.

Figure 4:
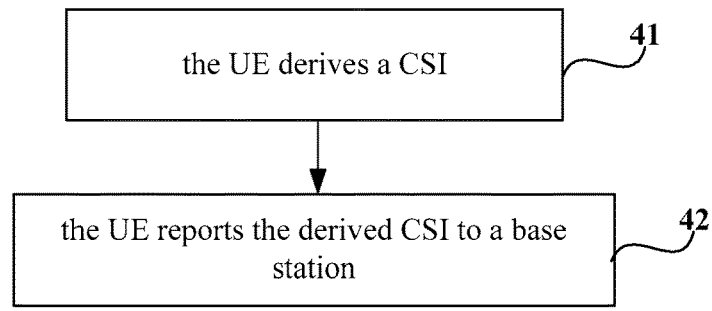
FIG. 4 is a flow chart of a method for reporting channel state information according to Embodiment 4 of the present disclosure.

In the Rel-11 system, when a UE is configured with a transmission mode 10, one or more CSI processes may be configured for the UE. One CSI process corresponds to one non-zero power CSI-RS resource and one interference measurement resource (IMR). When the UE is configured with a plurality of CSI processes, different CSI processes may represent different interference environments, so that the base station may derive channel state information in different interference environments based on the CSI derived through different CSI processes, so as to facilitate the realization of the CoMP transmission mechanism. However, in practical application, due to reasons such as the limited capacity of the UE, some UEs can only be configured with one CSI process. In order that the base station can also derive the CSI of such type of UE in different scenes (or say different interference environments), as shown in FIG. 4, this embodiment uses the following steps for reporting channel state information.

Step 41, the UE derives a CSI.

In the step 41, the UE may derive a CSI according to any one of the following manners:

Manner 1: if the CSI is a periodic CSI (for convenience of description, a periodically reported CSI in this text is referred to a periodic CSI), the UE derives the CSI based on an unrestricted observation interval, where the unrestricted observation interval may refer that the observation interval is unrestricted in both the time domain and the frequency domain; if the CSI derived by the UE is an aperiodic CSI (for convenience of description, an aperiodically reported CSI in this text is referred to an aperiodic CSI), the UE derives the CSI based on a restricted observation interval, where the restricted observation interval may refer that the observation interval is restricted in the time domain and/or the frequency domain.

Manner 2: if the UE is configured with a plurality of CSI processes, the UE derives the CSI based on an unrestricted observation interval, where the unrestricted observation interval may refer that the observation interval is unrestricted in both the time domain and the frequency domain;

if the UE is merely configured with one CSI process or the UE merely possesses a capability of supporting one CSI process, the UE derives the CSI based on a restricted observation interval, where the restricted observation interval may refer that the observation interval is restricted in the time domain and/or the frequency domain.

Manner 3: if the UE is merely configured with one CSI process or the UE merely possesses a capability of supporting one CSI process, and the CSI is an aperiodic CSI, the UE derives the CSI based on a restricted observation interval, where the restricted observation interval may refer that the observation interval is restricted in the time domain and/or the frequency domain; otherwise, the UE derives the CSI based on an unrestricted observation interval, where the unrestricted observation interval may refer that the observation interval is unrestricted in both the time domain and the frequency domain.

Manner 4: the UE receives a high layer signaling (e.g., a RRC signaling) transmitted by a base station, determines the manner for deriving the CSI according to the high layer signaling indication, and derives the CSI according to the determined manner.

In the manner 4, the UE determines the manner for deriving the CSI according to the high layer signaling indication, specifically it may be that: according to the high layer signaling indication, the UE determines that the manner for deriving the CSI is deriving the CSI based on an unrestricted observation interval, where the unrestricted observation interval may refer that the observation interval is unrestricted in both the time domain and the frequency domain; or, according to the high layer signaling indication, the UE determines that the manner for deriving the CSI is deriving the CSI based on a restricted observation interval, where the restricted observation interval may refer that the observation interval is restricted in the time domain and/or the frequency domain.

A 1 bit field may be included in the high layer signaling, and is used for indicating the manner for deriving the CSI by the UE. For example, when a value of the 1 bit field is set to 0, it indicates that the manner for deriving the CSI is deriving the CSI based on the unrestricted observation interval, when a value of the 1 bit field is set to 1, it indicates that the manner for deriving the CSI is deriving the CSI based on the restricted observation interval, and the like, it is not limited herein.

Manner 5: the UE receives a high layer signaling (e.g., a RRC signaling) transmitted by a base station, determines an observation interval for deriving the CSI according to the high layer signaling indication, and derives the CSI based on the determined observation interval.

In this manner, the UE determines an observation interval for deriving the CSI according to the high layer signaling indication. The observation interval may be one sub-frame or a plurality of sub-frames in the time domain, and may be one sub-band or a plurality of sub-bands in the frequency domain. Whether the observation interval is specifically a restricted observation interval or an unrestricted observation interval, depends on the observation interval indicated by the high layer signaling, for example, if the observation interval indicated by the high layer signaling is a sub-frame in the time domain and/or a sub-band in the frequency domain, i.e., at least one of a sub-frame in the time domain and a sub-band in the frequency domain, the observation interval is a restricted observation interval. Then, the UE derives the CSI based on the determined observation interval.

In each of the above manners, the restricted observation interval may refer that the UE derives the reported CSI based on the restricted observation interval, where the restricted observation interval may refer that the observation interval is a sub-frame in the time domain and/or a sub-band in the frequency domain. The restricted observation interval may also refer that the observation interval is a type of sub-frame in the time domain, a channel measurement resource and/or an interference measurement resource of the UE with this type of sub-frame experience a same similar environment.

Step 42, the UE reports the derived CSI to a base station.

In the step 42, the UE reports the CSI derived in the step 41 to the base station.

The UE derives the CSI according to any one of manners in the step 41, and reports the derived CSI to the base station through the step 42, the base station side determines a manner for deriving the CSI by the UE through specifying a manner corresponding to the step 41, so that the base station can acquire the manner for deriving the reported CSI, therefore, when the UE is merely configured with one CSI process, the base station can also derive the CSI of such type of UE in different scenarios (or may say different interference environments). Specifically, the base station may allow the channel measurement resource (non-zero power CSI-RS resource) and/or the interference measurement resource (CSI-IM resource or being referred as the IMR) corresponding to the CSI process to experience different scenarios in different sub-frames through configuring, when the UE derives the reported CSI based on a restricted observation interval, the base station may derive the CSI of the UE in different scenarios. Taking an example of performing a dynamic point blanking for a user merely configured with a single CSI process, the base station may allow the CSI-IM resource to experience different environments in different sub-frames, e.g., sub-frames corresponding to the CSI-IM resource may be divided into two types, in one type of sub-frames, a macrocell does not transmit data (blanking) on a corresponding CSI-IM resource element (RE), in the other type of sub-frames, a macrocell transmits data (i.e., not blanking) on a corresponding CSI-IM resource element (RE), thus the CSI derived by the UE based on the CSI-IM in these two types of sub-frames also has two types correspondingly, one type corresponds to the macrocell being blanking, and the other type corresponds to the macrocell being not blanking, therefore, the base station may perform a scheduling on the UE accordingly with reference to a corresponding CSI, and realize a dynamic point blanking (DPB). For another example, the UE is merely configured with a single CSI process, the base station transmits non-zero power CSI-RSs from different transmission points in different sub-frames corresponding to the channel measurement resource (non-zero power CSI-RS resource) corresponding to the CSI process, therefore, when the UE derives the CSI based on the restricted observation interval, different CSIs reported by different sub-frames may reflect the channel state of different transmission points, so that the UE can acquire the channel state of different transmission points.

Optionally, the method for reporting channel state information according to embodiments of the present disclosure may also include: the UE reports a manner for deriving the CSI to a base station. At this time, the base station may configured the UE to report the manner for deriving the CSI, i.e., if the base station configures that the UE needs to report the manner for deriving the CSI, then the UE needs to report the manner for deriving the CSI. Specifically, the UE may report the observation interval for deriving the CSI, where the observation interval may be one sub-frame or a plurality of sub-frames in the time domain, and may be one sub-band or a plurality of sub-bands in the frequency domain. The UE may also report 1 bit information only, where the 1 bit information is used for indicating the manner for deriving the CSI by the UE, specifically, the 1 bit information may be used for indicating that whether the CSI is derived by the UE based on an unrestricted observation interval or the CSI is derived by the UE based on a restricted observation interval. For example, when the 1 bit information is 0, it indicates that the UE derives the CSI based on an unrestricted observation interval, when the 1 bit information is 1, it indicates that the UE derives the CSI based on a restricted observation interval. In this manner, the UE may derive the CSI based on a restricted observation interval, and may also derive the CSI based on an unrestricted observation interval.

In the above embodiment, the base station can obtain the manner for deriving the reported CSI, therefore, when the UE is merely configured with one CSI process, the base station can also derive the CSI of such type of UE in different scenarios (or may say different interference environments).

A method for receiving channel state information is described in detail hereunder according to Embodiment 5.

Embodiment 5

This embodiment corresponds to the foregoing Embodiment 4, and describes from a base station side.

Figure 5:
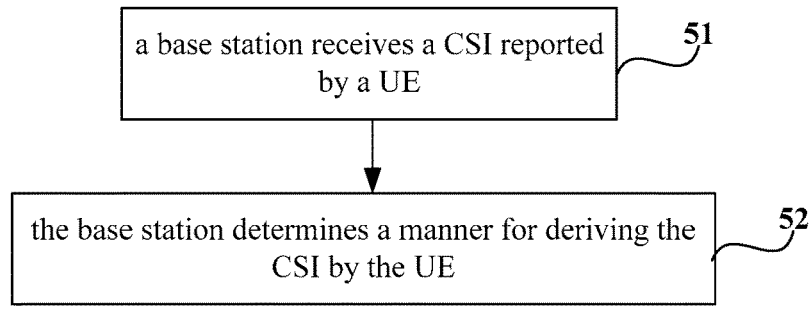
FIG. 5 is a flow chart of a method for receiving channel state information according to Embodiment 5 of the present disclosure.

With reference to FIG. 5, a method for receiving channel state information by a base station side includes:

Step 51, a base station receives a CSI reported by a UE;

Step 52, the base station determines a manner for deriving the CSI by the UE, so as to derive CSI of the UE in different scenarios according to the determined manner;

The manner of determining, by the base station, the manner for deriving the CSI by the UE, is similar to the foregoing Embodiment 4, including:

if the CSI is a periodic CSI, the base station determines that the UE derives the CSI based on an unrestricted observation interval; if the CSI is an aperiodic CSI, the base station determines that the UE derives the CSI based on a restricted observation interval;

or, including:

if the UE is configured with at least two CSI processes, the base station determines that the UE derives the CSI based on an unrestricted observation interval; if the UE is merely configured with one CSI process or the UE merely possesses a capability of supporting one CSI process, the base station determines that the UE derives the CSI based on a restricted observation interval;

or, including:

if the UE is configured with one CSI process or the UE merely possesses a capability of supporting one CSI process, and the CSI is an aperiodic CSI, the base station determines that the UE derives the CSI based on a restricted observation interval; otherwise, the base station determines that the UE derives the CSI based on an unrestricted observation interval;

or, including:

the base station determines that the UE derives the CSI according to a manner indicated in a high layer signaling transmitted by the base station;

or, including:

the base station determines that the UE derives the CSI based on an observation interval indicated in a high layer signaling transmitted by the base station;

or, including:

the base station derives the manner for deriving the CSI by the UE according to the received manner for deriving the CSI reported by the UE.

A restricted observation interval may be at least one of a sub-frame in the time domain and a sub-band in the frequency domain.

Optionally, before the base station receives the CSI reported by the user equipment (UE), further including:

the base station transmits a high layer signaling to the UE, to indicate a manner for deriving the CSI by the UE, or to indicate an observation interval for deriving the CSI by the UE.

In the above embodiment, the base station can obtain the manner for deriving the reported CSI, therefore, when the UE is merely configured with one CSI process, the base station can also derive the CSI of such type of UE in different scenarios (or may say different interference environments).

Persons skilled in the art can understand: all or a part of the steps of the methods according to embodiments of the present disclosure may be implemented by a program instructing relevant hardware. The program may be stored in a computer readable storage medium. When the program runs, the steps of the methods according to the foregoing embodiments are performed; and the storage medium includes: different media which may store program codes, such as an ROM, an RAM, a disk, AND a CD.

Figure 6:
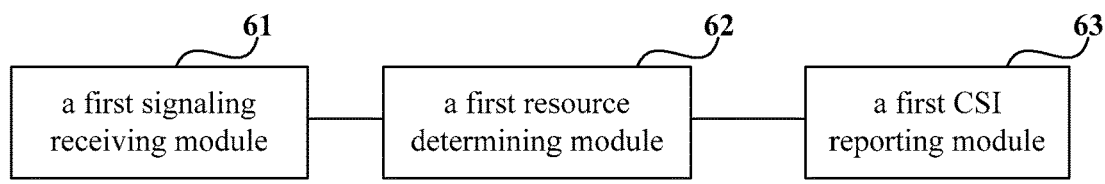
FIG. 6 is a schematic structural diagram of a user equipment according to an embodiment of the present disclosure.

FIG. 6 is a schematic structural diagram of a user equipment according to an embodiment of the present disclosure. The user equipment according to this embodiment is used to implement the method according to the foregoing Embodiment 1, as shown in FIG. 6, the user equipment includes: a first signaling receiving module 61, a first resource determining module 62, and a first CSI reporting module 63.

The first signaling receiving module 61 is configured to receive or detect an aperiodic channel state information (CSI) trigger signaling in a sub-frame n, where the n is an integer. The first resource determining module 62 is configured to determine a CSI measurement resource, where the CSI measurement resource is at least one of a channel state information reference signal (CSI-RS) resource and an IMR. The first CSI reporting module 63 is configured to report an aperiodic CSI according to the aperiodic CSI trigger signaling, where the reported aperiodic CSI is derived based on the determined CSI measurement resource.

The aperiodic CSI trigger signaling may be carried by a PDCCH or an EPDCCH, where a CRC of the PDCCH or the EPDCCH may be scrambled by a multi-user shared RNTI.

Optionally, the first resource determining module is specifically configured to determine at least one of a sub-frame n and a sub-frame n+1 as at least one of a sub-frame transmitting non-zero power CSI-RS and a sub-frame carrying zero power CSI-RS;

or, specifically configured to determine sub-frames from a sub-frame n to a sub-frame n+k1 as at least one of a sub-frame transmitting non-zero power CSI-RS and a sub-frame carrying zero power CSI-RS; where, k1 is an integer greater than or equal to 2;

or, specifically configured to determine a sub-frame n−k2 and a sub-frame n as at least one of a sub-frame transmitting non-zero power CSI-RS and a sub-frame carrying zero power CSI-RS; where, k2 is an integer greater than or equal to 1;

or, specifically configured to determine a sub-frame n−k3 and a sub-frame n+k4 as at least one of a sub-frame transmitting non-zero power CSI-RS and a sub-frame carrying zero power CSI-RS; where, both k3 and k4 are integers greater than or equal to 1;

or, specifically configured to determine a sub-frame n+k5 as any one kind of subframe or a combination of a sub-frame transmitting non-zero power CSI-RS and a sub-frame carrying zero power CSI-RS, and the sub-frame n+k5 is a first available sub-frame transmitting non-zero power CSI-RS and/or carrying zero power CSI-RS; where, k5 is an integer greater than or equal to 0;

or, specifically configured to determine a sub-frame n−k6 as at least one of a sub-frame transmitting non-zero power CSI-RS and a sub-frame carrying zero power CSI-RS, and the sub-frame n−k6 is a first available sub-frame transmitting non-zero power CSI-RS and/or carrying zero power CSI-RS; where, k6 is an integer greater than or equal to 0;

or, specifically configured to determine successive k7 sub-frames including a sub-frame n as at least one of a sub-frame transmitting non-zero power CSI-RS and a sub-frame carrying zero power CSI-RS; where, k7 is an integer greater than or equal to 2.

Optionally, the first CSI reporting module is specifically configured to report an aperiodic CSI on a PUSCH resource semi-statically reserved by a base station for the UE.

Figure 7:
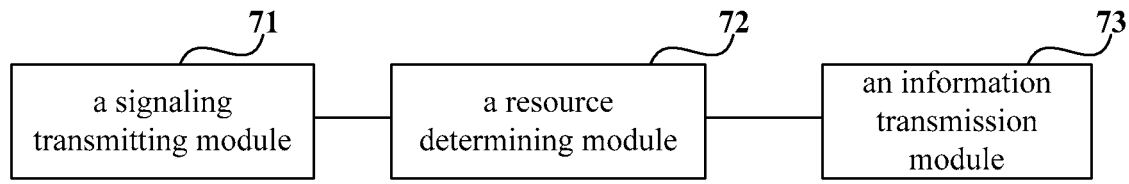
FIG. 7 is a schematic structural diagram of a base station according to an embodiment of the present disclosure.

FIG. 7 is a schematic structural diagram of a base station according to an embodiment of the present disclosure. A base station according to this embodiment is used to implement the method according to the foregoing Embodiment 2, as shown in FIG. 7, the base station includes: a signaling transmitting module 71, a resource determining module 72, and an information transmission module 73.

The signaling transmitting module 71 is configured to transmit an aperiodic channel state information (CSI) trigger signaling in a sub-frame n. The resource determining module 72 is configured to determine a CSI measurement resource, where the CSI measurement resource is at least one of a channel state information reference signal (CSI-RS) resource and an IMR. The information transmission module 73 is configured to perform information transmission according to the determined CSI measurement resource.

The aperiodic CSI trigger signaling is carried by a PDCCH or an EPDCCH, or is carried by a PDSCH, where a CRC of the PDCCH or the EPDCCH is scrambled by a multi-user shared RNTI.

Optionally, the resource determining module is specifically configured to: determine at least one of a sub-frame n and a sub-frame n+1 is determined as at least one of a sub-frame transmitting non-zero power CSI-RS and a sub-frame carrying zero power CSI-RS, if the signaling transmitting module transmits an aperiodic CSI trigger signaling in the sub-frame n;

or specifically configured to: determines sub-frames from a sub-frame n to a sub-frame n+k1 are determined as at least one of a sub-frame transmitting non-zero power CSI-RS and a sub-frame carrying zero power CSI-RS, if the signaling transmitting module transmits the aperiodic CSI trigger signaling in the sub-frame n; where, k1 is an integer greater than or equal to 2;

or specifically configured to: determine a sub-frame n−k2 and a sub-frame n are determined as at least one of a sub-frame transmitting non-zero power CSI-RS and a sub-frame carrying zero power CSI-RS, if the signaling transmitting module transmits the aperiodic CSI trigger signaling in the sub-frame n; where, k2 is an integer greater than or equal to 1;

or specifically configured to: determine a sub-frame n−k3 and a sub-frame n+k4 as at least one of a sub-frame transmitting non-zero power CSI-RS and a sub-frame carrying zero power CSI-RS, if the signaling transmitting module transmits the aperiodic CSI trigger signaling in the sub-frame n; where, both k3 and k4 are integers greater than or equal to 1;

or specifically configured to: determine a sub-frame n+k5 as at least one of a sub-frame transmitting non-zero power CSI-RS and a sub-frame carrying zero power CSI-RS, and the sub-frame n+k5 is a first available sub-frame transmitting non-zero power CSI-RS and/or carrying zero power CSI-RS, if the signaling transmitting module transmits the aperiodic CSI trigger signaling in the sub-frame n; where, k5 is an integer greater than or equal to 0;

or specifically configured to: determine a sub-frame n−k6 as at least one of a sub-frame transmitting non-zero power CSI-RS and a sub-frame carrying zero power CSI-RS, and the sub-frame n−k6 is a first available sub-frame transmitting non-zero power CSI-RS and/or carrying zero power CSI-RS, if the signaling transmitting module transmits the aperiodic CSI trigger signaling in the sub-frame n; where, k6 is an integer greater than or equal to 0;

or specifically configured to: determine successive k7 sub-frames including the sub-frame n as at least one of a sub-frame transmitting non-zero power CSI-RS and a sub-frame carrying zero power CSI-RS, if the signaling transmitting module transmits the aperiodic CSI trigger signaling in the sub-frame n; where, k7 is an integer greater than or equal to 2.

Optionally, the information transmission module is specifically configured to transmit a CSI-RS in the determined CSI-RS sub-frame;

or specifically configured to transmit a PDSCH according to the determined CSI measurement resource;

or specifically configured to derive at least one of a sub-frame transmitting non-zero power CSI-RS and a sub-frame carrying zero power CSI-RS according to the determined CSI measurement resource, transmit any one kind of or a combination of a PDCCH carrying downlink assignment information and an EPDCCH carrying downlink assignment information on the at least one of the sub-frame transmitting non-zero power CSI-RS and the sub-frame carrying zero power CSI-RS derived according to the determined CSI measurement resource, where a CRC of the PDCCH carrying downlink assignment information and the EPDCCH carrying downlink assignment information are scrambled by a first RNTI, and the first RNTI is different from a second RNTI used in a sub-frame not transmitting non-zero power CSI-RS and not carrying zero power CSI-RS.

Figure 8:
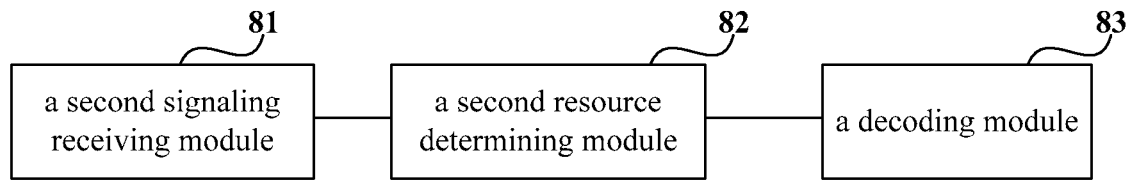
FIG. 8 is a schematic structural diagram of another user equipment according to an embodiment of the present disclosure.

FIG. 8 is a schematic structural diagram of another user equipment according to an embodiment of the present disclosure. A user equipment according to this embodiment is used to implement the method according to the foregoing Embodiment 3, as shown in FIG. 8, the user equipment includes: a second signaling receiving module 81, a second resource determining module 82, and a decoding module 83.

The second signaling receiving module 81 is configured to receive a downlink control channel signaling in a sub-frame n; where, the n is an integer. The second resource determining module 82 is configured to determine a channel state information (CSI) measurement resource according to the received downlink control channel signaling, where the CSI measurement resource is at least one of a channel state information reference signal (CSI-RS) resource and an IMR. The decoding module 83 is configured to perform information decoding according to the determined CSI measurement resource.

The downlink control channel signaling is carried by a PDCCH or an EPDCCH, a CRC of a bearer channel of downlink assignment information is scrambled by a first RNTI, and the first RNTI is different from a second RNTI used in a sub-frame not transmitting non-zero power CSI-RS and not carrying zero power CSI-RS.

Optionally, the second resource determining module is specifically configured to determine at least one of a sub-frame n and a sub-frame n+1 as at least one of a sub-frame transmitting non-zero power CSI-RS and a sub-frame carrying zero power CSI-RS;

or, specifically configured to determine sub-frames from a sub-frame n to a sub-frame n+k1 as at least one of a sub-frame transmitting non-zero power CSI-RS and a sub-frame carrying zero power CSI-RS; where, k1 is an integer greater than or equal to 2;

or, specifically configured to determine a sub-frame n−k2 and a sub-frame n as at least one of a sub-frame transmitting non-zero power CSI-RS and a sub-frame carrying zero power CSI-RS; where, k2 is an integer greater than or equal to 1;

or, specifically configured to determine a sub-frame n−k3 and a sub-frame n+k4 as at least one of a sub-frame transmitting non-zero power CSI-RS and a sub-frame carrying zero power CSI-RS; where, both k3 and k4 are integers greater than or equal to 1;

or, specifically configured to determine a sub-frame n+k5 as at least one of a sub-frame transmitting non-zero power CSI-RS and a sub-frame carrying zero power CSI-RS, and the sub-frame n+k5 is a first available sub-frame transmitting non-zero power CSI-RS and/or carrying zero power CSI-RS; where, k5 is an integer greater than or equal to 0;

or, specifically configured to determine a sub-frame n−k6 as at least one of a sub-frame transmitting non-zero power CSI-RS and a sub-frame carrying zero power CSI-RS, and the sub-frame n−k6 is a first available sub-frame transmitting non-zero power CSI-RS and/or carrying zero power CSI-RS; where, k6 is an integer greater than or equal to 0;

or, specifically configured to determine successive k7 sub-frames including a sub-frame n as at least one of a sub-frame transmitting non-zero power CSI-RS and a sub-frame carrying zero power CSI-RS; where, k7 is an integer greater than or equal to 2;

or, specifically configured to determine the CSI measurement resource according to information indicated in the downlink control channel signaling.

Figure 9:
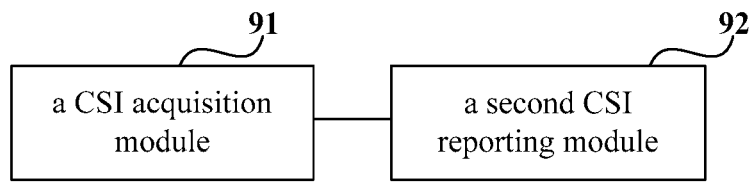
FIG. 9 is a schematic structural diagram of another user equipment according to an embodiment of the present disclosure.

FIG. 9 is a schematic structural diagram of another user equipment according to an embodiment of the present disclosure. A user equipment according to this embodiment is used to implement the method according to the foregoing Embodiment 4, as shown in FIG. 9, the user equipment includes: a CSI acquisition module 91 and a second CSI reporting module 92.

The CSI acquisition module 91 is configured to derive a channel state information (CSI). The second CSI reporting module 92 is configured to report the derived CSI to a base station.

The CSI acquisition module is specifically configured to: derives the CSI based on an unrestricted observation interval, if the CSI is a periodic CSI; derive the CSI based on a restricted observation interval, if the CSI is an aperiodic CSI;

or specifically configured to:

derive the CSI based on an unrestricted observation interval, if the user equipment is configured with at least two CSI processes; derive the CSI based on a restricted observation interval, if the UE is merely configured with one CSI process or the UE merely possesses a capability of supporting one CSI process;

or specifically configured to:

derive the CSI based on a restricted observation interval, if the user equipment is configured with one CSI process or the UE merely possesses a capability of supporting one CSI process, and the CSI is an aperiodic CSI; otherwise, derive the CSI based on an unrestricted observation interval;

or specifically configured to:

derive the CSI according to a manner indicated in a high layer signaling transmitted by the base station;

or specifically configured to:

derive the CSI based on an observation interval indicated in a high layer signaling transmitted by the base station.

The restricted observation interval is at least one of a sub-frame in the time domain and a sub-band in the frequency domain.

Figure 10:
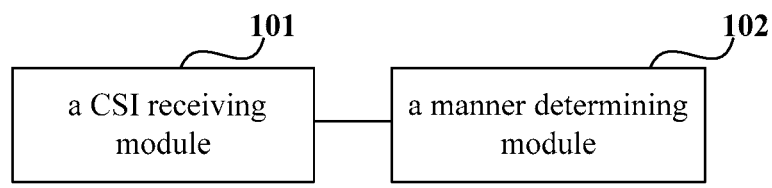
FIG. 10 is a schematic structural diagram of another base station according to an embodiment of the present disclosure.

FIG. 10 is a schematic structural diagram of another base station according to an embodiment of the present disclosure. A base station according to this embodiment is used to implement the method according to the foregoing Embodiment 5, as shown in FIG. 10, the base station includes: a CSI receiving module 101 and a manner determining module 102.

The CSI receiving module 101 is configured to receive a CSI reported by a user equipment (UE). The manner determining module 102 is configured to determine a manner for deriving the CSI by the UE, so as to derive CSI of the UE in different scenarios according to the determined manner.

The manner determining module 102 is specifically configured to:

determine that the UE derives the CSI based on an unrestricted observation interval, if the CSI is a periodic CSI; determine that the UE derives the CSI based on a restricted observation interval, if the CSI is an aperiodic CSI;

or specifically configured to:

determine that the UE derives the CSI based on an unrestricted observation interval, if the UE is configured with a plurality of CSI processes; determine that the UE derives the CSI based on a restricted observation interval, if the UE is merely configured with one CSI process or the UE merely possesses a capability of supporting one CSI process;

or specifically configured to:

determine that the UE derives the CSI based on a restricted observation interval, if the UE is configured with one CSI process or the UE merely possesses a capability of supporting one CSI process, and the CSI is an aperiodic CSI; otherwise, the base station determines that the UE derives the CSI based on an unrestricted observation interval;

or specifically configured to:

determine that the UE derives the CSI according to a manner indicated in a high layer signaling transmitted by the base station;

or specifically configured to:

determine that the UE derives the CSI based on an observation interval indicated in a high layer signaling transmitted by the base station;

or specifically configured to:

acquire the manner for deriving the CSI by the UE according to a received manner for deriving the CSI reported by the UE.

The restricted observation interval may be at least one of a sub-frame in the time domain and a sub-band in the frequency domain.

Optionally, the base station further includes: a signaling transmitting module, configured to transmit a high layer signaling to the UE, to indicate a manner for deriving the CSI by the UE, or to indicate an observation interval for deriving the CSI by the UE.

Figure 11:
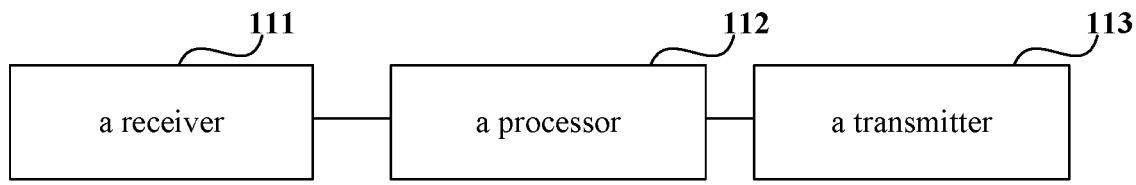
FIG. 11 is a schematic structural diagram of another user equipment according to an embodiment of the present disclosure.

FIG. 11 is a schematic structural diagram of another user equipment according to an embodiment of the present disclosure. A user equipment according to this embodiment is used to implement the method according to the foregoing Embodiment 1, as shown in FIG. 11, the user equipment includes: a receiver 111, a processor 112 and a transmitter 113, the receiver 111 is configured to receive or detect an aperiodic channel state information (CSI) trigger signaling in a sub-frame n, where then is an integer; the processor 112 is configured to determine a CSI measurement resource, where the CSI measurement resource is at least one of a channel state information reference signal (CSI-RS) resource and an interference measurement resource; the transmitter 113 is configured to report an aperiodic CSI according to the aperiodic CSI trigger signaling, where the reported aperiodic CSI is derived by the processor based on the determined CSI measurement resource.

Figure 12:
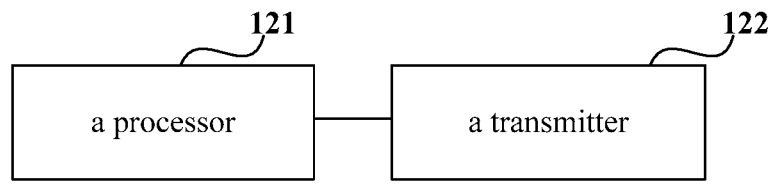
FIG. 12 is a schematic structural diagram of another base station according to an embodiment of the present disclosure.

FIG. 12 is a schematic structural diagram of another base station according to an embodiment of the present disclosure. A base station according to this embodiment is used to implement the method according to the foregoing Embodiment 2, as shown in FIG. 12, the base station includes: a processor 121 and a transmitter 122, the transmitter 122 is configured to transmit an aperiodic channel state information (CSI) trigger signaling in a sub-frame n, where the n is an integer; the processor 121 is configured to determine a CSI measurement resource, where the CSI measurement resource is at least one of a channel state information reference signal (CSI-RS) resource and an interference measurement resource; the transmitter 121 is further configured to perform information transmission according to the CSI measurement resource determined by the processor.

Figure 13:
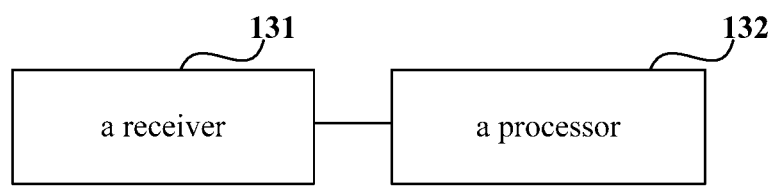
FIG. 13 is a schematic structural diagram of still another user equipment according to an embodiment of the present disclosure.

FIG. 13 is a schematic structural diagram of still another user equipment according to an embodiment of the present disclosure. A user equipment according to this embodiment is used to implement the method according to the foregoing Embodiment 3, as shown in FIG. 13, the user equipment includes: a receiver 131 and a processor 132, the receiver 131 is configured to receive a downlink control channel signaling in a sub-frame n; where, the n is an integer; the processor 132 is configured to determine a channel state information (CSI) measurement resource according to a received downlink control channel signaling, where the CSI measurement resource is at least one of a channel state information reference signal (CSI-RS) resource and an interference measurement resource; the processor 132 is further configured to perform information decoding according to a determined CSI measurement resource.

Figure 14:
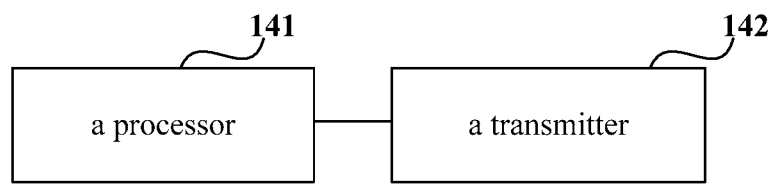
FIG. 14 is a schematic structural diagram of still another user equipment according to an embodiment of the present disclosure.

FIG. 14 is a schematic structural diagram of still another user equipment according to an embodiment of the present disclosure. A user equipment according to this embodiment is used to implement the method according to the foregoing Embodiment 4, as shown in FIG. 14, the user equipment includes: a processor 141 and a transmitter 142, the processor 141 is configured to derive a channel state information (CSI); the transmitter 142 is configured to report the derived CSI to a base station.

The processor 142 is specifically configured to: if the CSI is a periodic CSI, the UE derives the CSI based on an unrestricted observation interval; if the CSI is an aperiodic CSI, the UE derives the CSI based on a restricted observation interval;

or specifically configured to:

if the user equipment is configured with at least two CSI processes, the UE derives the CSI based on an unrestricted observation interval; if the UE is merely configured with one CSI process or the UE merely possesses a capability of supporting one CSI process, the UE derives the CSI based on a restricted observation interval;

or specifically configured to:

if the UE is configured with one CSI process or the UE merely possesses a capability of supporting one CSI process, and the CSI is an aperiodic CSI, the UE derives the CSI based on a restricted observation interval;

or specifically configured to:

the UE derives the CSI according to a manner indicated in a high layer signaling transmitted by the base station;

or specifically configured to:

the UE derives the CSI based on an observation interval indicated in a high layer signaling transmitted by the base station.

Figure 15:
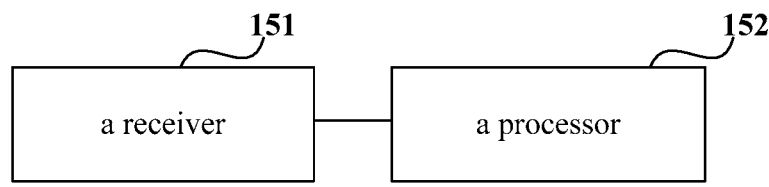
FIG. 15 is a schematic structural diagram of still another base station according to an embodiment of the present disclosure.

FIG. 15 is a schematic structural diagram of still another base station according to an embodiment of the present disclosure. A base station according to this embodiment is used to implement the method according to the foregoing Embodiment 5, as shown in FIG. 15, the base station includes: a receiver 151 and a processor 152, the receiver 151 is configured to receive a channel state information (CSI) reported by a user equipment (UE); the processor 152 is configured to determine manners for deriving the CSI by the UE; the processor 152 is specifically configured to:

if the CSI is a periodic CSI, the base station determines that the UE derives the CSI based on an unrestricted observation interval; if the CSI is an aperiodic CSI, the base station determines that the UE derives the CSI based on a restricted observation interval;

or specifically configured to:

if the UE is configured with at least two CSI processes, the base station determines that the UE derives the CSI based on an unrestricted observation interval; if the UE is configured with one CSI process or the UE merely possesses a capability of supporting one CSI process, the base station determines that the UE derives the CSI based on a restricted observation interval;

or specifically configured to:

if the UE is configured with one CSI process or the UE merely possesses a capability of supporting one CSI process, and the CSI is an aperiodic CSI, the base station determines that the UE derives the CSI based on a restricted observation interval;

or specifically configured to:
the base station determines that the UE derives the CSI according to a manner indicated in a high layer signaling transmitted by the base station;
or specifically configured to:
the base station determines that the UE derives the CSI based on an observation interval indicated in a high layer signaling transmitted by the base station;
or specifically configured to:
the base station acquires the manner for deriving the CSI by the UE according to a received manner for deriving the CSI reported by the UE.

Finally, it should be noted: the foregoing embodiments are merely used to illustrate the technical solutions of the present disclosure, and should not be considered as a limitation thereof; although detailed descriptions are given to the present disclosure with reference to the foregoing embodiments, persons of ordinary skill in the art should understand: they can still make modifications to the technical solutions recited in each individual embodiment described above, or make equivalent replacements to a part of or all the technical features thereof; while these modifications or replacements will not make the nature of corresponding technical.

What is claimed is:

1. A method carried out by a terminal, the method comprising:
   receiving in a time unit n, from a network device, a downlink control information (DCI) comprising an information for triggering an aperiodic channel state information (CSI) report, wherein the information for triggering the aperiodic CSI report indicates a resource for an aperiodic channel state information reference signal (CSI-RS);
   determining the resource for the aperiodic CSI-RS according to the information for triggering the aperiodic CSI report, wherein the resource for the aperiodic CSI-RS is in a time unit n+k5, and k5 is an integer greater than or equal to 0;
   sending, to the network device, the aperiodic CSI report, wherein the aperiodic CSI report is derived by the terminal according to the aperiodic CSI-RS on the resource for the aperiodic CSI-RS.

2. The method according to claim 1, wherein the resource for the aperiodic CSI-RS is a resource for an aperiodic non-zero power CSI-RS.

3. The method according to claim 1, further comprising:
   receiving, from the network device, a measurement resource configuration indication information, wherein the measurement resource configuration indication information indicates at least one of a number of CSI-RS antenna ports, a CSI-RS configuration or a zero power CSI-RS configuration.

4. The method according to claim 3, wherein the measurement resource configuration indication information is semi-statically configured for the terminal.

5. The method according to claim 4, wherein the measurement resource configuration indication information excludes sub-frame configuration information.

6. A method carried out by a network device, the method comprising:
   transmitting in a time unit n, to a terminal, a downlink control information (DCI) comprising an information for triggering an aperiodic channel state information (CSI) report, wherein the information for triggering the aperiodic CSI report indicates a resource for an aperiodic channel state information reference signal (CSI-RS), and wherein the resource for the aperiodic CSI-RS is in a time unit n+k5, and k5 is an integer greater than or equal to 0;
   transmitting in the time unit n+k5, to the terminal, the aperiodic CSI-RS on the resource for the aperiodic CSI-RS; and
   receiving, from the terminal, the aperiodic CSI report.

7. The method according to claim 6, wherein the aperiodic CSI-RS comprises an aperiodic non-zero power CSI-RS.

8. The method according to claim 6, further comprising:
   transmitting, to the terminal, a measurement resource configuration indication information, wherein the measurement resource configuration indication information indicates at least one of a number of CSI-RS antenna ports, a CSI-RS configuration or a zero power CSI-RS configuration.

9. The method according to claim 8, wherein the measurement resource configuration indication information is semi-statically configured for the terminal.

10. The method according to claim 9, wherein the measurement resource configuration indication information excludes sub-frame configuration information.

11. The method according to claim 1, wherein the time unit n is a subframe n, and the time unit n+k5 is a subframe n+k5.

12. The method according to claim 6, wherein the time unit n is a subframe n, and the time unit n+k5 is a subframe n+k5.

13. The method according to claim 1, further comprising:
    deriving, by the terminal, the aperiodic CSI report according to the aperiodic CSI-RS on the resource for the aperiodic CSI-RS.

14. The method according to claim 1, wherein the aperiodic CSI-RS is only transmitted when the DCI comprising the information for triggering the aperiodic CSI report has been transmitted.

15. The method according to claim 6, wherein the aperiodic CSI-RS is only transmitted when the DCI comprising the information for triggering the aperiodic CSI report has been transmitted.

16. An apparatus, comprising:
    a non-transitory processor readable medium storing instructions; and a processor executing the instructions stored in the non-transitory processor readable medium, wherein execution of the instructions configures the apparatus to:
    receive in a time unit n, from a network device, a downlink control information (DCI) comprising an information for triggering an aperiodic channel state information (CSI) report, wherein the information for triggering the aperiodic CSI report indicates a resource for an aperiodic channel state information reference signal (CSI-RS);
    determine the resource for the aperiodic CSI-RS according to the information for triggering the aperiodic CSI report, wherein the resource for the aperiodic CSI-RS is in a time unit n+k5, and k5 is an integer greater than or equal to 0; and
    send, to the network device, the aperiodic CSI report, wherein the aperiodic CSI report is derived by the apparatus according to the aperiodic CSI-RS on the resource for the aperiodic CSI-RS.

17. The apparatus according to claim 16, wherein the resource for the aperiodic CSI-RS is a resource for an aperiodic-non-zero power CSI-RS.

18. The apparatus according to claim 16, wherein the execution of the instructions further configures the apparatus to:
receive, from the network device, a measurement resource configuration indication information, wherein the measurement resource configuration indication information indicates at least one of a number of CSI-RS antenna ports, a CSI-RS configuration or a zero power CSI-RS configuration.

19. The apparatus according to claim 18, wherein the measurement resource configuration indication information is semi-statically configured.

20. The apparatus according to claim 19, wherein the measurement resource configuration indication information excludes sub-frame configuration information.

21. The apparatus according to claim 16, wherein the time unit n is a subframe n, and the time unit n+k5 is a subframe n+k5.

22. The apparatus according to claim 16, wherein the execution of the instructions further configures the apparatus to derive the aperiodic CSI report according to the aperiodic CSI-RS on the resource for the aperiodic CSI-RS.

23. The apparatus according to claim 16, wherein the aperiodic CSI-RS is only transmitted when the DCI comprising the information for triggering the aperiodic CSI report has been transmitted.

24. An apparatus, comprising: a non-transitory processor readable medium storing instructions; and a processor executing the instructions stored in the non-transitory processor readable medium, wherein execution of the instructions configures the apparatus to:
transmit in a time unit n, to a terminal, a downlink control information (DCI) comprising an information for triggering an aperiodic channel state information (CSI) report, wherein the information for triggering the aperiodic CSI report indicates a resource for an aperiodic channel state information reference signal (CSI-RS), and wherein the resource for the aperiodic CSI-RS is in a time unit n+k5, and k5 is an integer greater than or equal to 0;
transmit in the time unit n+k5, to the terminal, the aperiodic CSI RS on the resource for the aperiodic CSI-RS; and
receive, from the terminal, the aperiodic CSI report.

25. The apparatus according to claim 24, wherein the aperiodic CSI-RS comprises an aperiodic non-zero power CSI-RS.

26. The apparatus according to claim 24, wherein the execution of the instructions further configures the apparatus to:
transmit, to the terminal, a measurement resource configuration indication information, wherein the measurement resource configuration indication information is used to indicate at least one of a number of CSI-RS antenna ports, a CSI-RS configuration or a zero power CSI-RS configuration.

27. The apparatus according to claim 26, wherein the measurement resource configuration indication information is semi-statically configured for the terminal.

28. The apparatus according to claim 27, wherein the measurement resource configuration indication information excludes sub-frame configuration information.

29. The apparatus according to claim 24, wherein the time unit n is a subframe n, and the time unit n+k5 is a subframe n+k5.

30. The apparatus according to claim 24, wherein the aperiodic CSI-RS is only transmitted when the DCI comprising the information for triggering the aperiodic CSI report has been transmitted.

31. A non-transitory computer-readable storage medium comprising instructions that, when executed on a computer, cause the computer to:
receive in a time unit n, from a network device, a downlink control information (DCI) comprising an information for triggering an aperiodic channel state information (CSI) report, wherein the information for triggering the aperiodic CSI report indicates a resource for an aperiodic channel state information reference signal (CSI-RS);
determine the resource for the aperiodic CSI-RS according to the information for triggering the aperiodic CSI report, wherein the resource for the aperiodic CSI-RS is in a time unit n+k5, and k5 is an integer greater than or equal to 0;
send, to the network device, the aperiodic CSI report, wherein the aperiodic CSI report is derived according to the aperiodic CSI-RS on the resource for the aperiodic CSI-RS.

32. A non-transitory computer-readable storage medium comprising instructions that, when executed on a computer, cause the computer to:
transmit in a time unit n, to a terminal, a downlink control information (DCI) comprising an information for triggering an aperiodic channel state information (CSI) report, wherein the information for triggering the aperiodic CSI report indicates a resource for an aperiodic channel state information reference signal (CSI-RS), and wherein the resource for the aperiodic CSI-RS is in a time unit n+k5, and k5 is an integer greater than or equal to 0;
transmit in the time unit n+k5, to the terminal, the aperiodic CSI-RS on the resource for the aperiodic CSI-RS; and
receive, from the terminal, the aperiodic CSI report.

* * * * *